United States Patent
de Jong et al.

(10) Patent No.: US 9,946,032 B2
(45) Date of Patent: Apr. 17, 2018

(54) FIBER OPTIC MODULES HAVING A FIBER TRAY, OPTICAL-TO-OPTICAL FIBER OPTIC CONNECTORS, AND METHODS THEREOF

(71) Applicant: CORNING OPTICAL COMMUNICATIONS LLC, Hickory, NC (US)

(72) Inventors: Michael de Jong, Colleyville, TX (US); Kevin Eugene Elliott, Horseheads, NY (US); Carl Randall Harrison, Decatur, NY (US); Craig Alan Strause, Springtown, TX (US)

(73) Assignee: Corning Optical Communications LLC, Hickory, NC (US)

( * ) Notice: Subject to any disclaimer, the term of this patent is extended or adjusted under 35 U.S.C. 154(b) by 72 days.

(21) Appl. No.: 13/838,668

(22) Filed: Mar. 15, 2013

(65) Prior Publication Data

US 2014/0105543 A1    Apr. 17, 2014

Related U.S. Application Data

(60) Provisional application No. 61/636,159, filed on Apr. 20, 2012, provisional application No. 61/651,307, filed on May 24, 2012.

(51) Int. Cl.
    *G02B 6/38*          (2006.01)
    *G02B 6/36*          (2006.01)

(52) U.S. Cl.
    CPC ......... *G02B 6/3809* (2013.01); *G02B 6/3853* (2013.01); *G02B 6/3885* (2013.01);
    (Continued)

(58) Field of Classification Search
    CPC .... G02B 6/4292; G02B 6/423; G02B 6/4204; G02B 6/3897; G02B 6/4284; G02B 6/4201; G02B 6/3636; G02B 6/3861
See application file for complete search history.

(56) References Cited

U.S. PATENT DOCUMENTS 5,985,086 A * 11/1999 Peall ..................... B29C 65/548
                                                   156/292
6,267,515 B1    7/2001   Okuda et al.
(Continued)

FOREIGN PATENT DOCUMENTS

CN      101228466 A     7/2008
CN      201886174 U     6/2011
(Continued)

OTHER PUBLICATIONS

EP 161 Communication issued in corresponding EP Application No. 13719210.0, dated Jan. 16, 2015.
(Continued)

*Primary Examiner* — Thomas A Hollweg
*Assistant Examiner* — Mary A El Shammaa
(74) *Attorney, Agent, or Firm* — Michael E. Carroll, Jr.

(57) ABSTRACT

Fiber optic modules, fiber optic connectors, and methods are disclosed. In one embodiment, a fiber optic module includes a body and a fiber tray. The body includes a fiber tray recess extending from a first surface, a fiber-end datum surface positioned an end of the fiber tray recess, and a plurality of lens surfaces. The plurality of lens surfaces, the fiber-end datum surface, and intervening portions of the body define a plurality of lenses each having a linear optical axis. The fiber tray includes a plurality of fiber support features disposed on a first surface. The plurality of fiber support features is configured to receive a plurality of optical fibers. The fiber tray is disposed within the fiber tray recess and secured to the body.

18 Claims, 16 Drawing Sheets

(52) U.S. Cl.
CPC .......... *G02B 6/3652* (2013.01); *G02B 6/3849* (2013.01); *G02B 6/3861* (2013.01); *Y10T 29/49826* (2015.01)

(56) References Cited

U.S. PATENT DOCUMENTS

| | | | |
|---|---|---|---|
| 6,860,648 | B2 | 3/2005 | Jin et al. |
| 7,399,125 | B1 | 7/2008 | Whaley et al. |
| 8,277,130 | B2 | 10/2012 | Nishimura et al. ............. 385/83 |
| 9,201,201 | B2 | 12/2015 | Charbonneau-Lefort et al. |
| 2001/0004413 | A1* | 6/2001 | Aihara ................. G02B 6/4214 385/88 |
| 2002/0110338 | A1* | 8/2002 | Dair .................... G02B 6/4292 385/92 |
| 2002/0141708 | A1* | 10/2002 | Shin .................... G02B 6/4204 385/92 |
| 2002/0181882 | A1* | 12/2002 | Hibbs-Brenner ........ G02B 6/26 385/52 |
| 2003/0072538 | A1 | 4/2003 | Jin et al. ......................... 385/89 |
| 2005/0013554 | A1* | 1/2005 | Killer .................. G02B 6/4292 385/88 |
| 2005/0069256 | A1 | 3/2005 | Jennings et al. |
| 2006/0038655 | A1* | 2/2006 | Hauke ................ G07C 9/00087 340/5.52 |
| 2006/0039655 | A1* | 2/2006 | Wilson ............................ 385/79 |
| 2006/0104576 | A1* | 5/2006 | Nagasaka ................ G02B 6/32 385/93 |
| 2007/0183709 | A1 | 8/2007 | Furuno et al. |
| 2007/0183725 | A1* | 8/2007 | Nagasaka ............. G02B 6/4204 385/92 |
| 2008/0144999 | A1 | 6/2008 | Takeda et al. .................. 385/51 |
| 2009/0154884 | A1 | 6/2009 | Chen et al. ..................... 385/79 |
| 2011/0052132 | A1 | 3/2011 | Teymouri |
| 2011/0123150 | A1 | 5/2011 | Zbinden et al. |
| 2011/0123151 | A1 | 5/2011 | Zbinden et al. |
| 2012/0008902 | A1 | 1/2012 | Wu ................................. 385/77 |
| 2012/0025209 | A1 | 2/2012 | Kim et al. ....................... 257/81 |
| 2012/0027346 | A1* | 2/2012 | Castagna ............. G02B 6/4206 385/33 |
| 2012/0189254 | A1 | 7/2012 | Wang et al. |
| 2012/0328245 | A1 | 12/2012 | Lin ................................. 385/77 |
| 2013/0209043 | A1 | 8/2013 | Norris et al. |
| 2013/0230280 | A1 | 9/2013 | Kadar-Kallen |
| 2015/0268425 | A1 | 9/2015 | de Jong et al. |

FOREIGN PATENT DOCUMENTS

| | | | |
|---|---|---|---|
| CN | 102346276 A | 2/2012 | ............... G02B 6/32 |
| CN | 101828137 B | 9/2012 | ............... G02B 6/36 |
| WO | WO2006/108024 A1 | 10/2006 | ............... G02B 6/38 |
| WO | 2010036684 | 4/2010 | |
| WO | WO2012/174227 A1 | 12/2012 | |
| WO | WO2014151204 A1 | 9/2014 | ............... G02B 6/32 |

OTHER PUBLICATIONS

International Preliminary Report on Patentability issued in corresponding PCT Appln. No. PCT/US2016/037362, dated Oct. 30, 2014.
International Search Report and Written Opinion issued in corresponding PCT Appln. No. PCT/US2016/037362, dated Oct. 30, 2014.
Chinese Search Report/Office Action for Application No. 2013800238121, dated Aug. 13, 2015, 2 pages.
Chinese Second Office Action and Search Report CN201380023812.1 dated Jun. 6, 2016.
International Search Report PCT/US2013/037407 dated Jul. 18, 2013.

* cited by examiner

FIBER OPTIC MODULES HAVING A FIBER TRAY, OPTICAL-TO-OPTICAL FIBER OPTIC CONNECTORS, AND METHODS THEREOF

RELATED APPLICATIONS

This application claims the benefit of priority under § 119 of U.S. Provisional Application Ser. No. 61/636,159 filed on Apr. 20, 2012, and U.S. Provisional Application Ser. No. 61/651,307 filed on May 24, 2012, the content of which are relied upon and incorporated herein by reference in their entirety.

FIELD

The present disclosure generally relates to fiber optic modules and, more particularly, to fiber optic modules and fiber optic connectors having a fiber tray coupled to a body in optically coupled connector applications.

BACKGROUND

Short-distance data links used for consumer electronics are reaching increasingly higher data rates, especially those used for video and data storage applications. Examples include the USB 3.0 protocol at 5 Gb/s, HDMI at 10 Gb/s and Thunderbolt™ at 10 Gb/s over two channels. At such high data rates, traditional copper cables have limited transmission distance and cable flexibility. For at least these reasons, optical fiber is emerging as an alternative to copper wire for accommodating the high data rates for the next generations of electronic devices such as consumer devices.

Unlike telecommunication applications that employ expensive, high-power edge-emitting lasers along with modulators, short-distance optical fiber links are based on low-cost, low-power, directly modulated light sources such as vertical-cavity surface-emitting lasers (VCSELs). Optical-to-optical fiber optic connectors of optical cable assemblies pass optical signals to and from mated, aligned optical connectors, typically by use of lenses. To be viable for consumer electronics and other electronics, optical cable assemblies used to couple optical signals must be precisely aligned with lenses of the fiber optic connector, and the lenses of a first fiber optic connector must be precisely aligned with lenses of a second, mated optical connector. This requirement drives the need for the design of assemblies to be simple to manufacture while also having suitable performance. Accordingly, there is an unresolved need for fiber optic modules and connectors that simplify the alignment of optical fibers.

SUMMARY

Embodiments of the present disclosure relate to two-piece fiber optic modules including a fiber tray and a body. The fiber tray, which maintains a plurality of optical fibers, is positioned in the body and secured by an adhesive. The ends of the optical fibers extending from the fiber tray are actively positioned within fiber support features of the body and secured to the body at the fiber support features with an adhesive such as an index-matching adhesive. The fiber ends may be passively or actively aligned and positioned such that they are disposed at a reference fiber-end datum surface such that they are in optical communication (i.e., optically aligned) with a plurality of lenses defined by the body. The body may be provided in an optical-to-optical fiber optic connector of an optical cable assembly. Methods of processing optical fibers using a fiber tray are also disclosed.

One aspect of the disclosure is a fiber optic module including a body and a fiber tray. The body is transmissive to light having a predetermined wavelength, and includes, a fiber tray recess, a fiber-end datum surface, and a plurality of lens surfaces spaced apart from the fiber-end datum surface. The plurality of lens surfaces, the fiber-end datum surface, and intervening portions of the body define a plurality of lenses each having a linear optical axis. The fiber tray includes a plurality of fiber support features. The plurality of fiber support features is configured to receive a plurality of optical fibers. The fiber tray is disposed within the fiber tray recess and secured to the body such that the plurality of fiber support features is substantially aligned with the linear optical axes of the plurality of lenses.

Another aspect of the disclosure is the aforementioned fiber optic module, wherein the fiber tray further includes an adhesive receiving feature. In one embodiment the fiber optic module includes a first adhesive receiving feature, a second adhesive receiving feature, and an adhesive well extending a depth into the fiber tray across the plurality of fiber support features.

Another aspect of the disclosure is any aforementioned fiber optic module, wherein the adhesive well is positioned at a first surface of the fiber tray.

Another aspect of the disclosure is any aforementioned fiber optic module, wherein the first adhesive receiving feature and the second adhesive receiving feature are located closer to a second edge than a first edge of the fiber tray.

Another aspect of the disclosure is any aforementioned fiber optic module, wherein the fiber tray further includes an adhesive receiving feature. One embodiment has a fiber tray with a first additional adhesive receiving feature and a second additional adhesive receiving feature.

Another aspect of the disclosure is any aforementioned fiber optic module having a tilting feature so that the fiber tray is tilted with respect to the fiber tray recess (i.e., pocket of the fiber optic module). In one embodiment, the fiber tray optionally includes a second surface opposite from the first surface, and one or more tilting protrusions extending from the second surface proximate to the first edge such that the fiber tray is tilted with respect to a floor of the fiber tray recess. However, the tilting feature may be disposed in the recess of the body for tilting the fiber tray with respect to the fiber tray recess.

Another aspect of the disclosure is any aforementioned fiber optic module, wherein the body includes a fiber support ledge including a plurality of body fiber support features having a first end and a second end at the fiber-end datum surface, and the plurality of fiber support features is substantially aligned with the plurality of body fiber support features of the body.

Another aspect of the disclosure is any aforementioned fiber optic module, wherein the fiber-end datum surface is angled with respect to a plane that is orthogonal to the fiber support ledge.

Another aspect of the disclosure is any aforementioned fiber optic module, wherein the body includes a mechanical coupling surface configured to contact a mechanical coupling surface of a mated body. The mechanical coupling surface includes a cover recess defining a cover wall that is offset from and substantially parallel to the mechanical coupling surface. The body includes a cover disposed in the cover recess such that the cover protects the plurality of lens surfaces. Another aspect of the disclosure is any aforementioned body, wherein a front surface of the cover is offset from the mechanical coupling surface.

Another aspect of the disclosure is any aforementioned fiber optic module, wherein the cover recess extends from the first surface of the body to a first cover support surface and a second cover support surface, and a gap is present between the first cover support surface and the second cover support surface. The cover is disposed on the first cover support surface and the second cover support surface within the cover recess. The cover may be formed from any suitable material such as glass or polymer.

Another aspect of the disclosure is any aforementioned fiber optic module, wherein the body includes a mechanical coupling surface configured to contact a mechanical coupling surface of a mated body. The mechanical coupling surface includes a cover recess defining a cover wall that is offset from and substantially parallel to the mechanical coupling surface. The cover wall includes an optical interface recess defining an optical interface surface that is offset from and substantially parallel to the mechanical coupling surface. The body further includes a cover disposed in the cover recess, and the plurality of lens surfaces is located at the optical interface surface and is offset from the cover wall such that the plurality of lens surfaces does not contact the cover.

Another aspect of the disclosure is any aforementioned fiber optic module, wherein a front surface of the cover is offset from the mechanical coupling surface.

Another aspect of the disclosure is any aforementioned fiber optic module, wherein the cover recess extends from the first surface of the body to a first cover support surface and a second cover support surface such that a gap is present between the first cover support surface and the second cover support surface. The cover is disposed on the first cover support surface and the second cover support surface within the cover recess.

Another aspect of the disclosure is any aforementioned fiber optic module, wherein the body includes a mechanical coupling surface configured to contact a mechanical coupling surface of a mated body. In one embodiment, the coupling includes a first alignment pin bore extending from the mechanical coupling surface into the body, and a second alignment pin bore extending from the mechanical coupling surface into the body.

Another aspect of the disclosure is a fiber optic connector including a plurality of optical fibers, wherein each optical fiber has a core surrounded by an outer coating includes a stripped region where the core is exposed for a length from a fiber-end. The fiber optic connector further includes a body that is transmissive to light having a predetermined wavelength and a fiber tray. The body includes a first surface, a fiber tray recess (i.e., a pocket) extending from the first surface, a fiber-end datum surface, a fiber support ledge including a plurality of body fiber support features having a first end and a second end at the fiber-end datum surface, and a plurality of lens surfaces spaced apart from the fiber-end datum surface. The plurality of lens surfaces, the fiber-end datum surface, and intervening portions of the body define a plurality of lenses each having a linear optical axis. The fiber tray includes a plurality of fiber support features. The plurality of optical fibers is disposed within the plurality of fiber support features of the fiber tray such that each individual optical fiber extends beyond the second edge by an offset length $L_f$. The fiber tray is disposed within the fiber tray recess and secured to the body by an adhesive such that the stripped region of the plurality of optical fibers are disposed in the plurality of body fiber support features, and fiber-ends of the plurality of optical fibers are positioned at the fiber-end datum surface and are substantially aligned with the linear optical axes of the plurality of lenses. The fiber optic connector further includes a housing surrounding the body and the fiber tray.

Another aspect of the disclosure is the aforementioned fiber optic connector, wherein the body includes a mechanical coupling surface configured to contact a mechanical coupling surface of a mated body. The mechanical coupling surface includes a cover recess defining a cover wall that is offset from and substantially parallel to the mechanical coupling surface. The body includes a cover disposed in the cover recess such that the cover protects the plurality of lens surfaces.

Another aspect of the disclosure is a method including positioning a plurality of optical fibers having a core surrounded by an outer coating in a plurality of fiber support features in a fiber tray such that the plurality of optical fibers extend beyond an insertion edge of the fiber tray by an offset length, and applying an adhesive a surface of the fiber tray to secure the plurality of optical fibers to the fiber tray. The method further includes stripping the outer coating of each optical fiber of the plurality of optical fibers to expose the core, thereby forming a stripped region of each optical fiber, and cleaving each optical fiber to a desired length $L_f$ beyond the insertion edge of the fiber tray. The method may also include positioning the fiber tray into a body including a first surface, a fiber tray recess extending from the first surface, a fiber-end datum surface, and a plurality of lens surfaces spaced apart from the fiber-end datum surface, wherein the plurality of lens surfaces, the fiber-end datum surface, and intervening portions of the body define a plurality of lenses each having a linear optical axis. The body further includes a plurality of body fiber support features terminating at the fiber-end datum surface, wherein the fiber tray is inserted into the body such that the stripped regions of the plurality of optical fibers are disposed within the plurality of body fiber support features and a fiber-end of each optical fiber is positioned at the fiber-end datum surface. The method may also include applying an adhesive to secure the fiber tray and the plurality of optical fibers to the body.

Additional features and advantages will be set forth in the detailed description which follows, and in part will be readily apparent to those skilled in the art from that description or recognized by practicing the embodiments as described herein, including the detailed description which follows, the claims, as well as the appended drawings.

It is to be understood that both the foregoing general description and the following Detailed Description represent embodiments of the disclosure, and are intended to provide an overview or framework for understanding the nature and character of the disclosure as it is claimed. The accompanying drawings are included to provide a further understanding of the disclosure, and are incorporated into and constitute part of this specification. The drawings illustrate various embodiments of the disclosure and together with the description set forth herein serve to explain the principles and operations of the disclosure. The claims are incorporated into and constitute part of the Detailed Description set forth below.

BRIEF DESCRIPTION OF THE DRAWINGS

The components of the following figures are illustrated to emphasize the general principles of the present disclosure and are not necessarily drawn to scale. The embodiments set forth in the drawings are illustrative and exemplary in nature and not intended to limit the subject matter defined by the claims. The following detailed description of the illustrative embodiments can be understood when read in conjunction with the following drawings, where like structure is indicated with like reference numerals and in which:

Figure 1:
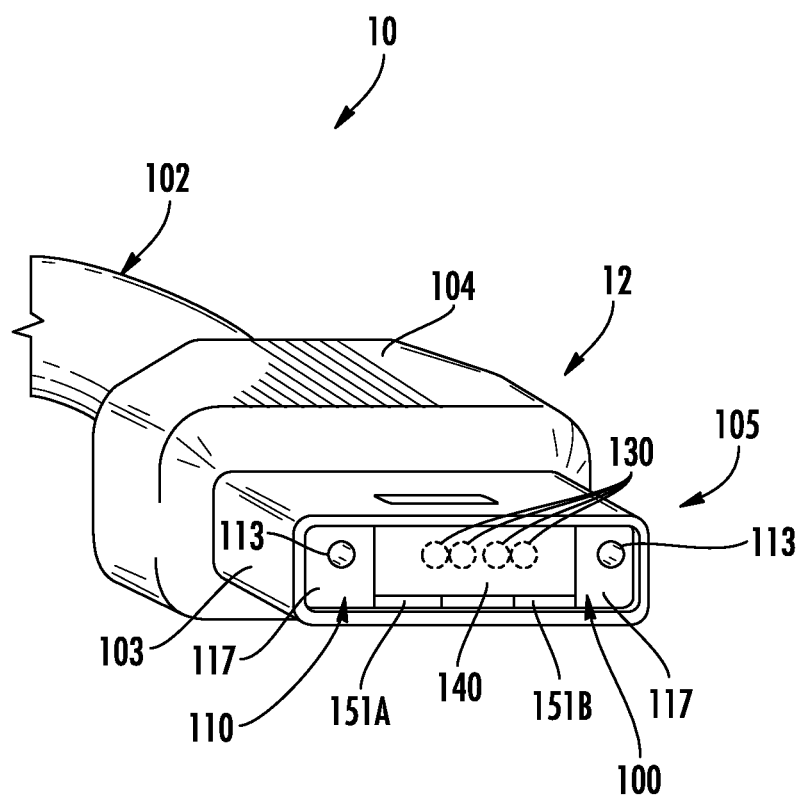
FIG. 1 is a front elevated view of an example optical cable assembly according to one or more embodiments of the disclosure.

Additional features and advantages of the disclosure are set forth in the Detailed Description that follows and will be apparent to those skilled in the art from the description or recognized by practicing the disclosure as described herein, together with the claims and appended drawings.

Cartesian coordinates are shown in certain of the Figures for the sake of reference and are not intended as limiting with respect to direction or orientation.

DETAILED DESCRIPTION

Embodiments of the present disclosure relate to fiber optic modules and fiber optic connectors and, more particularly, to fiber optic modules and fiber optic connectors that are configured for optical-to-optical coupling. Such fiber optic connectors may be referred to as device-device optical connectors or optical-to-optical fiber optic connectors because a first device (e.g., a fiber optic connector of an optical cable assembly) is optically coupled to a second device (e.g., a fiber optic receptacle of an electronics device, such as a consumer electronics device (e.g., mobile phone, personal computer, etc.)) by direct connection. Accordingly, light signals are passed between two coupled devices to provide optical communication therebetween.

Referring generally to the figures, embodiments are directed to two-piece fiber optic modules including a body and a fiber tray. The body includes a plurality of lenses having a linear optical axis defined therein and the fiber tray secures a plurality of optical fiber for processing before being attached to the body. Embodiments also relate to fiber optic connectors and methods of processing and aligning optical fibers with lenses of a body. Optical fibers of an optical cable assembly are first inserted into fiber support features (e.g., grooves) of the fiber tray and then further processed (e.g., laser or mechanically stripping one or more coating layers to expose the optical fiber core or cladding, and laser or mechanically cleaving to obtain a desired fiber length extending beyond the fiber tray, etc.). The fiber tray is then positioned in the body and secured by an adhesive or a snap fit, for example. The fiber ends of the optical fibers extending from the fiber tray are actively positioned within fiber support features (e.g., grooves) of the body (e.g., by use of a microscope or other vision system, or an automated device with feedback) and secured to the body at the fiber support features with an index-matching adhesive. The fiber ends are actively aligned and positioned such that they are positioned at (i.e., contact or nearly contact) a reference fiber-end datum surface such that they are aligned with a plurality of lenses defined by the body.

Use of the fiber tray enables simultaneous processing of multiple optical fibers prior to insertion into the body, which may reduce fabrication time, cost or both. Further, the fiber tray secures the loose optical fibers at a location close to the fiber ends such that the positioning of the stripped portion of the optical fibers in the fiber support features of the body by an active alignment process is quick and easy for manufacturing. Because the body has features for positioning the fiber ends at the desired locations only the tolerances of the body dimensions need to be tightly controlled. The tolerances of fiber tray dimensions may be more loosely controlled, which may reduce the overall cost of fabricating the two-piece fiber optic interface system. Various embodiments of fiber optic modules, optical-electrical connector, and methods for making a fiber optic module are described in detail below.

Referring now to FIG. 1, an optical cable assembly 10 comprising an exemplary fiber optic connector 12 is depicted. It should be understood that the configuration of the optical cable assembly 10 and fiber optic connector 12 of FIG. 1 is provided for illustrative purposes only, and that the fiber optic modules and fiber optic connectors described herein are not limited to the configuration of FIG. 1. The optical cable assembly 10 includes an optical cable 102 with a fiber optic connector 12 disposed at each end. It is noted that only one fiber optic connector 12 is depicted in FIG. 1. A plurality of optical fibers 106 (see FIGS. 2A, 2B, 3A, and 3B) is disposed within a jacket of the optical cable 102 and extends into the fiber optic connector 12. The example fiber optic connector 12 generally includes a plug portion 105 that extends from a connector body 104. The plug portion 105 includes a plug housing 103 in which a two-piece fiber optic module 100 is disposed. As described in more detail below, the fiber optic module generally includes a body 110 providing a plurality of lens surfaces 130, and a fiber tray 120 (not shown in FIG. 1) coupled to the body 110.

The plurality of optical fibers 106 is optically coupled to the plurality of lens surfaces 130 which, in the illustrated embodiment, are positioned behind a cover 140 and are configured to create a plurality of refractive lenses. Cover 140 may be formed from any suitable optically transmissive material such as a glass or polymer. The plug portion 105 may be configured to be inserted into a mated fiber optic connector, such as a fiber optic receptacle of an electronics device (e.g., a personal computer, a server computer, a media player, an electronic storage device, a tablet computer, a smart phone, and the like) or another optical cable assembly. Accordingly, the fiber optic connectors 12 described herein, as well as the fiber optic modules 100 associated therewith, are configured to be optically coupled to mated fiber optic connectors by direct optical coupling wherein light signals propagating through the plurality of lens surface 130 from the plurality of optical fibers 106 are received by a plurality of lenses or lens surfaces of a mated fiber optic connector where they are either further transmitted or converted into electrical signals.

Figure 2A:
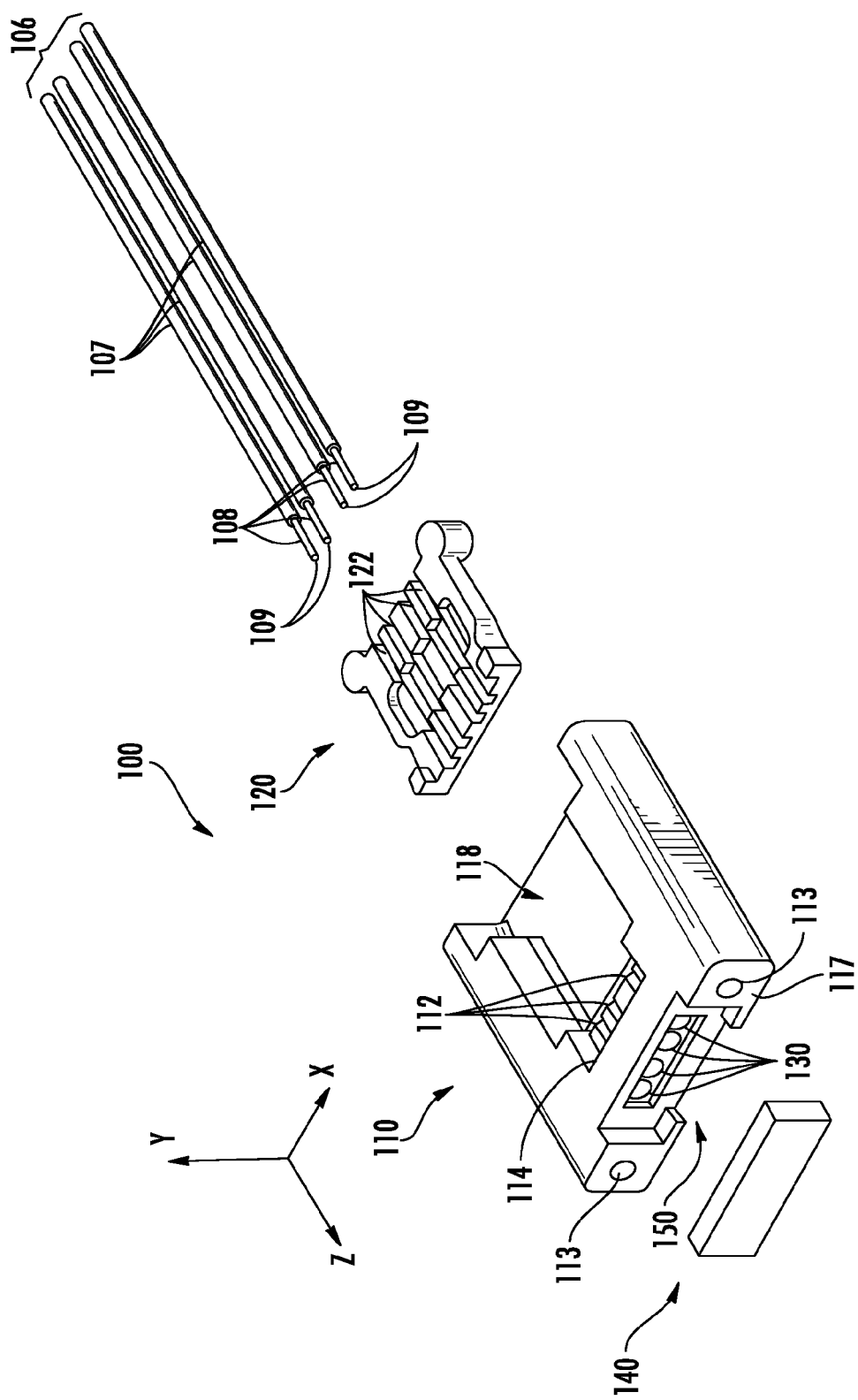
FIG. 2A is a top-down, elevated front view of an explanatory fiber optic module and a plurality of optical fibers in a disassembled state according to one or more embodiments of the disclosure.
Figure 2B:
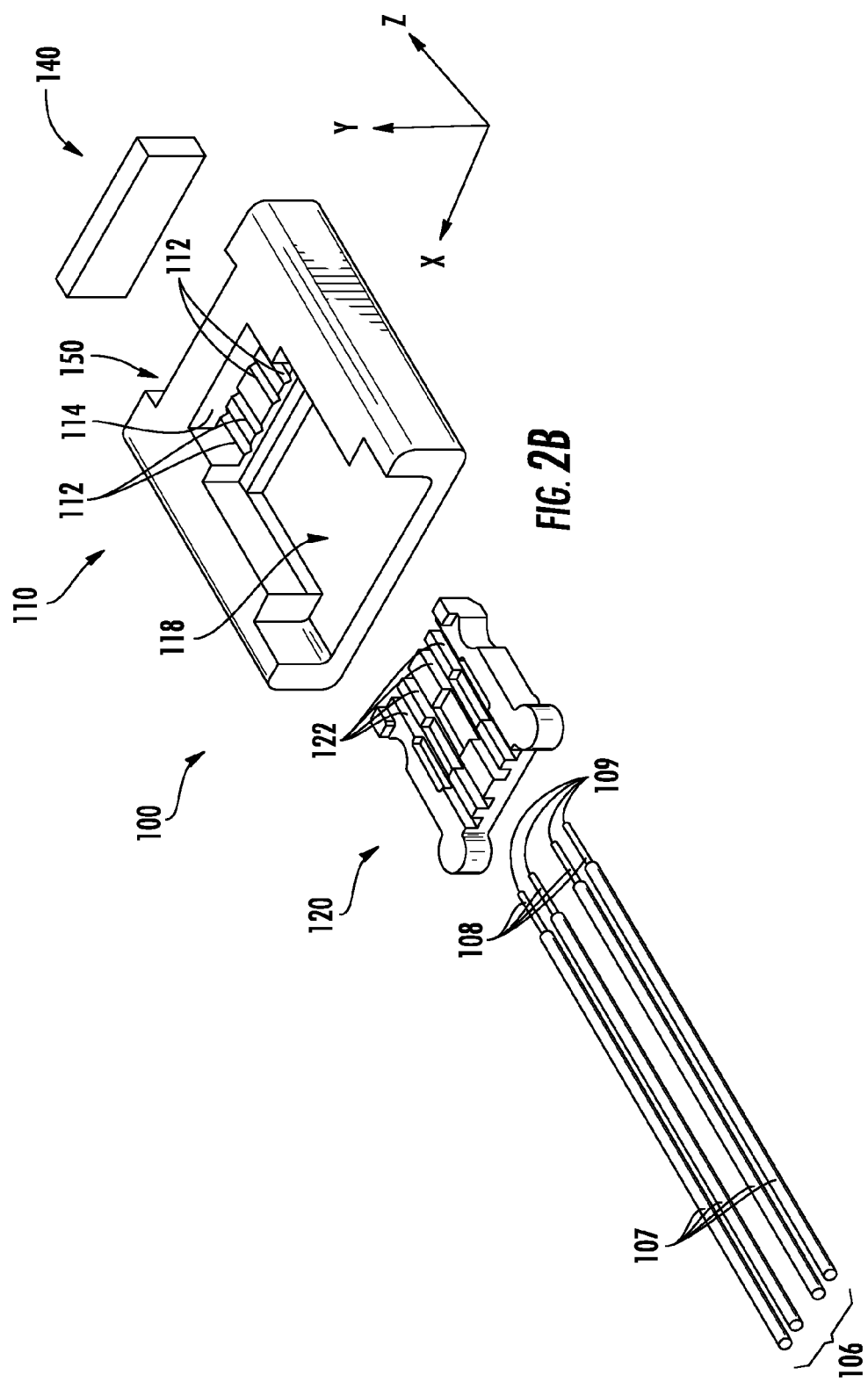
FIG. 2B is a top-down, elevated rear view of the fiber optic module and the plurality of optical fibers depicted in FIG. 2A also in a disassembled state.
Figure 3A:
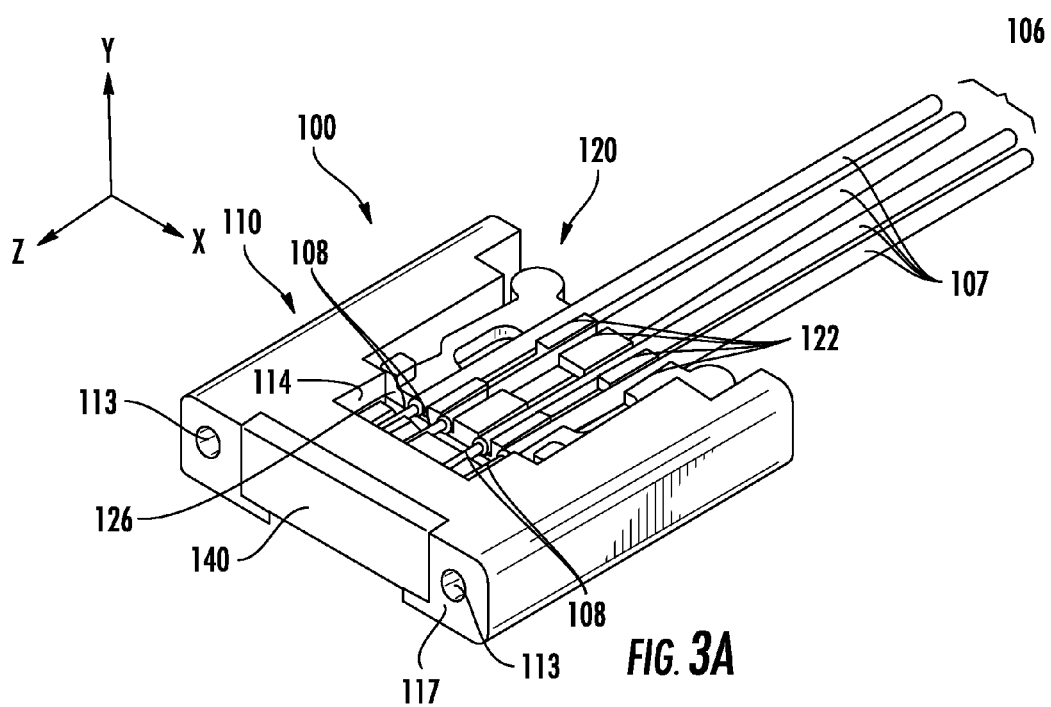
FIG. 3A is a top-down, elevated front view of the fiber optic module and the plurality of optical fibers depicted in FIG. 2A shown in an assembled state.
Figure 3B:
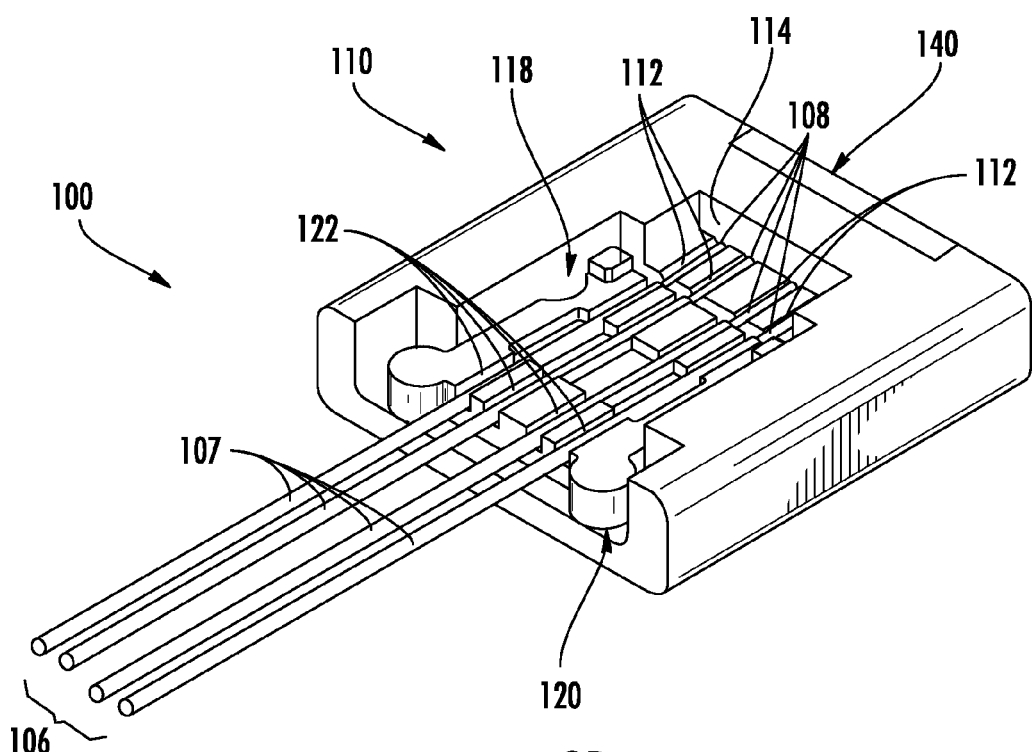
FIG. 3B is a top-down, elevated rear view of the assembled fiber optic module and plurality of optical fibers depicted in FIG. 3A.

Generally, the fiber optic module 100 includes a body 110 and a fiber tray 120 (i.e., an attachment ferrule) that maintains an end portion of the optical fibers 106. In embodiments, the fiber optic module 100 may be provided as a kit of parts for optically coupling optical fibers to lens surfaces for inclusion in a fiber optic connector. FIG. 2A is a front elevated view of a fiber optic module 100 in a disassembled state, and FIG. 2B is a rear elevated view of the disassembled fiber optic module 100 shown in FIG. 2A. FIG. 3A is a front elevated view of the fiber optic module 100 shown in FIG. 2A but in an assembled state, while FIG. 3B is a rear elevated view of the assembled fiber optic module shown in FIG. 3A.

As described in more detail below, the optical fibers 106 include a stripped portion wherein a coating 107 defined by one or more coating layers is stripped away thereby exposing a fiber core 108. The fiber tray 120 is configured to be disposed and secured into a fiber tray recess 118 of the body 110 such that fiber-ends 109 of the optical fibers 106 of the optical cable are positioned at a fiber-end datum surface 114. The fiber ends of the optical fibers 106 should contact the fiber-end datum surface 114. However, due to variations in fiber length, some of the fiber-ends 109 may nearly contact the fiber-end datum surface 114. The optical fibers 106 are supported by fiber support features 122 in a top surface of the fiber tray 120. The optical fibers 106 may be secured to the body 110 by an adhesive. As an example, the adhesive may be an index-matching adhesive applied after positioning the fiber-ends 109 such that they are optically aligned with lenses defined in part by lens surfaces 130 of the body 110. In embodiments, the fiber-ends 109 may be aligned with a datum that acts as a surrogate for the position of the lenses.

In the illustrated embodiment, the body 110 further includes a cover 140 that is disposed in a cover recess 150 in a mechanical coupling surface 117. The mechanical coupling surface 117 may be configured to contact a mechanical coupling surface 117 of a mated body, for example. The cover 140 may protect the plurality of lens surfaces 130 that are located within the cover recess 150 from damage due to contact with external objects. The cover 140 may be fabricated from any material that is transmissive to light in the wavelength of the light signals passing to and from the fiber optic connector 12.

Fiber Tray and Optical Fibers

Figure 4A:
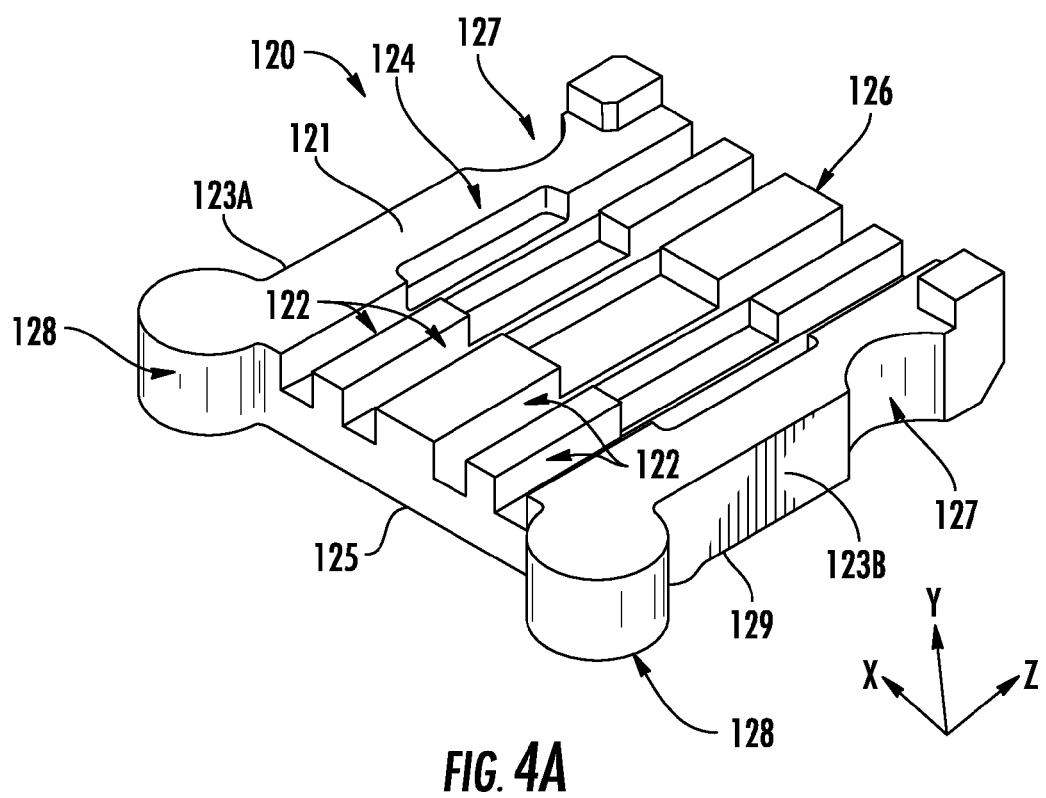
FIG. 4A is a top-down elevated view of a fiber tray of the fiber optic module depicted in FIGS. 2A, 2B, 3A and 3B.
Figure 4B:
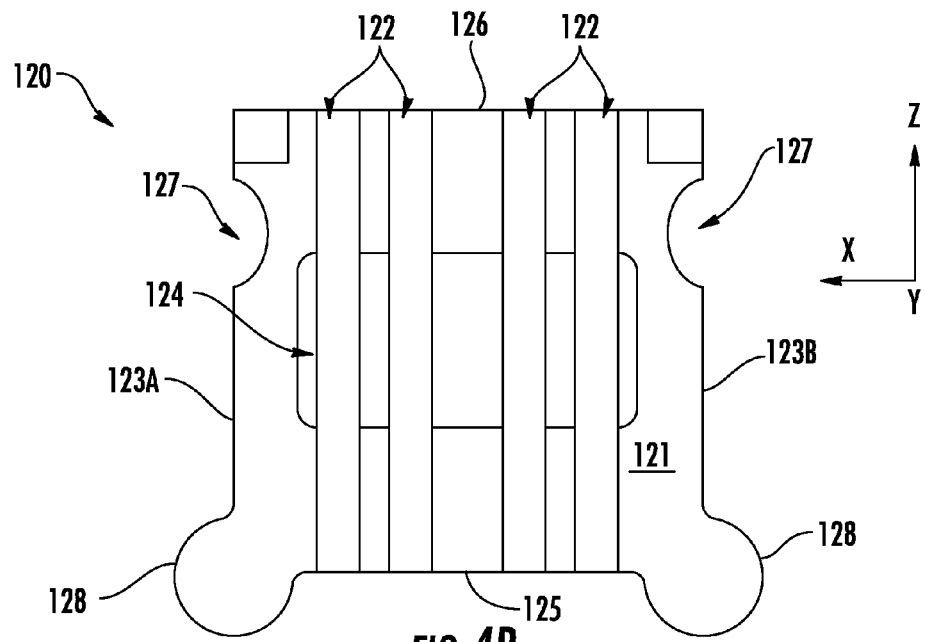
FIG. 4B is a top-down view of the fiber tray depicted in FIG. 4A.
Figure 4C:
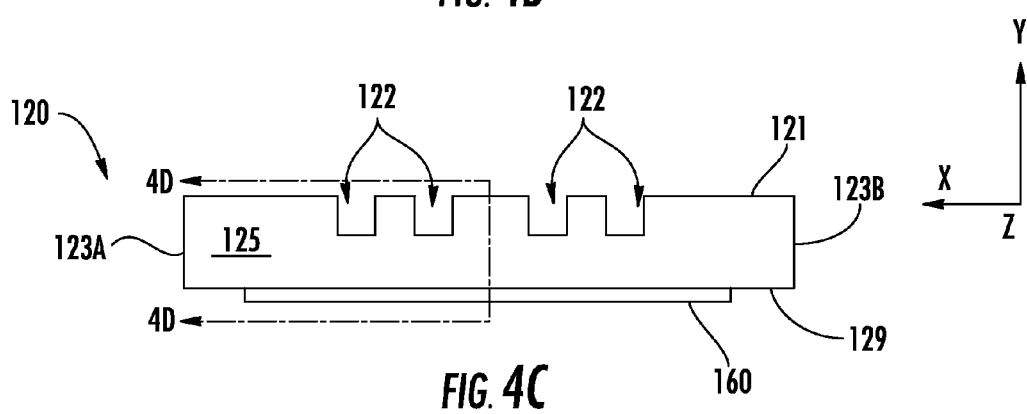
FIG. 4C is a rear view of the fiber tray depicted in FIGS. 4A and 4B.
Figure 4D:
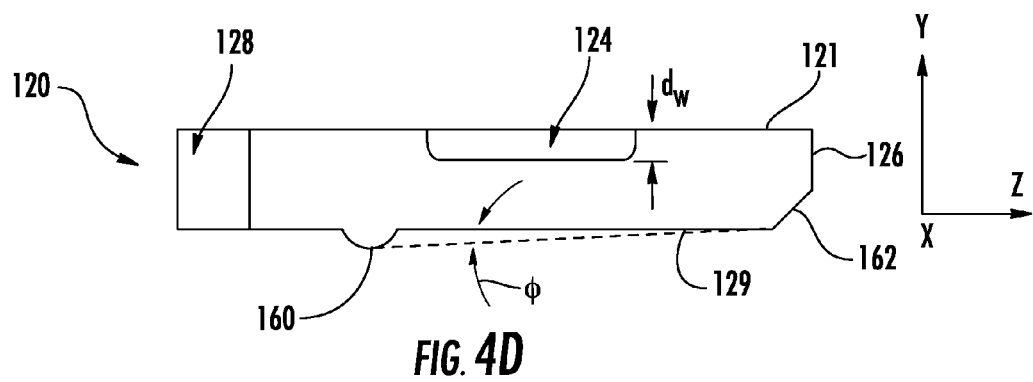
FIG. 4D is a cross-sectional view of another fiber tray similar to the fiber tray depicted in FIG. 4C taken along line 4D-4D that further includes an optional tilting feature.

Referring now to FIGS. 4A-4D, an exemplary fiber tray 120 is described in detail. FIG. 4A is a top-down elevated view of the exemplary fiber tray 120, while FIG. 4B is a top view of the fiber tray 120, FIG. 4C is a rear view of the fiber tray 120, and FIG. 4D is a cross-sectional view of the fiber tray taken along line 4D-4D in FIG. 4C.

The fiber tray 120 is configured to maintain a plurality of optical fibers 106 prior to insertion into the body 110 and, in some embodiments, prior to processing of the optical fibers 106, such as laser stripping to expose the core of each optical fiber. The fiber tray 120 may be made of any suitable material, such as molded thermoplastic, for example. Exemplary materials include, but are not limited to, LEXAN 940A fabricated by the SABIC innovative Plastics and UDEL 3700HC manufactured by Solvay Specialty Polymers. The material may be selected so it transmits ultra-violet ("UV") wavelengths such that UV-cured adhesives may be cured below the fiber tray 120. In embodiments, the features of the fiber tray 120, such as the fiber support features 122 configured as open grooves in this embodiment, may be formed by injection molding using a mold fabricated by electrical discharge machining ("EDM") or wire EDM, for example The fiber tray 120 depicted in FIGS. 4A-4D generally includes a first surface 121, a second surface 129 opposite from the first surface 121, a first edge 125 defining a rear portion of the fiber tray 120 (i.e., insertion edge), a second edge 126 opposite from the first edge 125, a third edge 123A, and a fourth edge 123B opposite from the third edge 123A. The second edge 126 may optionally include a chamfer 162 that provides a clearance for a laser beam when stripping and/or cleaving the optical fibers 106.

Figure 5A:
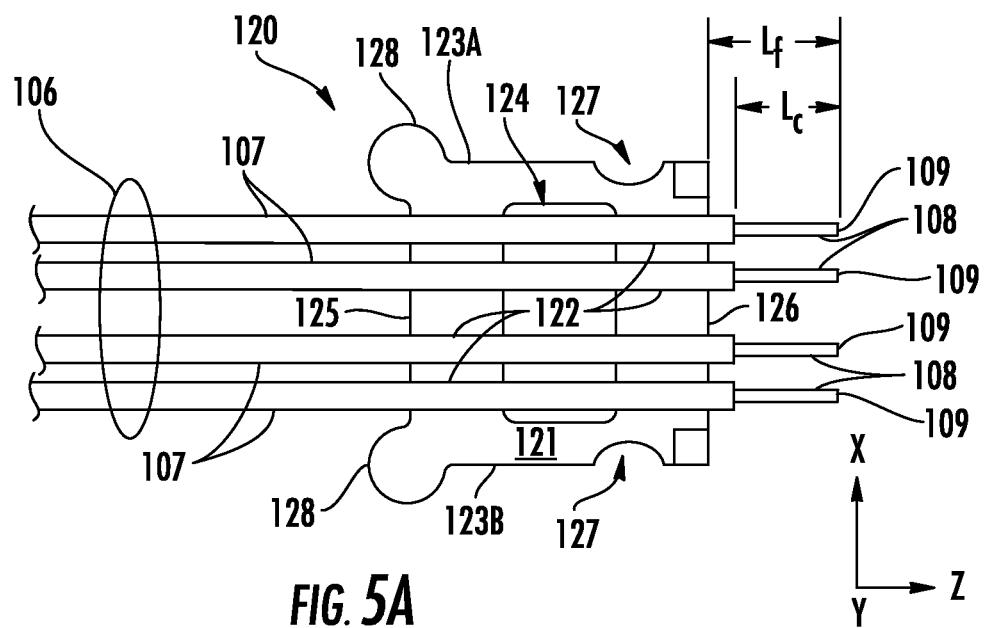
FIG. 5A is a top view of the fiber tray depicted in FIGS. 4A-4D populated with optical fibers.
Figure 5B:
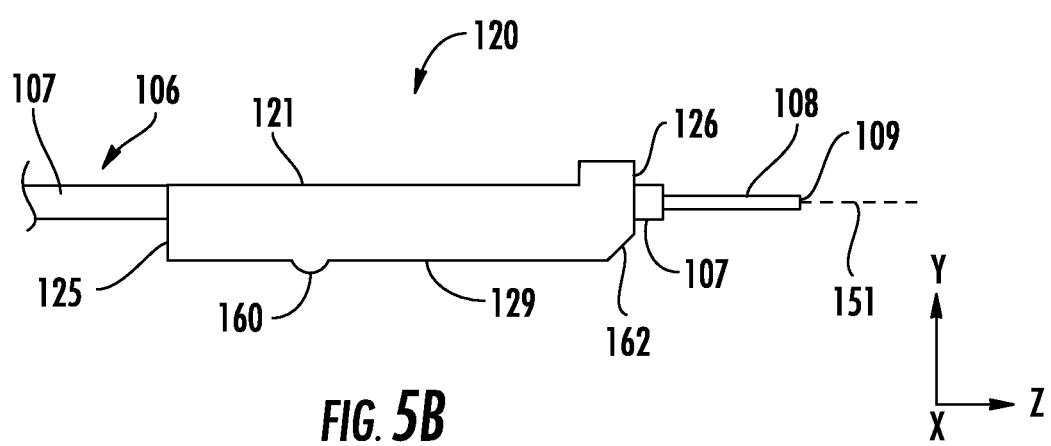
FIG. 5B is a side view of the populated fiber tray depicted in FIG. 4D.

A plurality of fiber support features 122 such as grooves extend from the first edge 125 to the second edge 126 on the first surface 121 of the fiber tray 120, but fiber support features may have lengths that are shorter than the fiber tray. The fiber support features 122 are configured to receive a non-stripped portion (i.e., "coated") of the plurality of optical fibers 106, as shown in FIGS. 5A and 5B. Although the grooves 122 are illustrated as rectangular grooves in FIGS. 4A-4C, embodiments are not limited thereto. For example, the grooves 122 may be configured as "V" shaped grooves (i.e., shaped as the letter "V" when viewed in cross section) or "U" shaped grooves (i.e., shaped as the letter "U" when viewed in cross section), but any suitable support features may be used for the optical fiber.

Referring to FIGS. 5A and 5B, four optical fibers 106 disposed within four fiber support features 122 configured as grooves are illustrated. An example optical fiber 106 is a multi-mode optical fiber, such as, for example, a large-core, high-numerical-aperture optical fiber, e.g., the VSDN™ optical fiber, available from Corning Incorporated of Corning, N.Y. Example optical fibers 106 are also discussed in published PCT Patent Application Publication No. WO2010036684, entitled "High numerical aperture multi-mode optical fiber," which is incorporated by reference herein. Each optical fiber 106 has a central core 108 ("core") having an index of refraction $n_C$. The core 108 that is surrounded by a cladding (not shown) having an index of refraction $n_{CL}$, where $n_{CL}<n_C$. In an example, the optical fiber 106 has a numerical aperture $NA_F=0.29$. Also in an example, the core 108 has a gradient-index profile, which in an example is a parabolic profile. In an example, the core 108 has a diameter of about 80 microns. The core 108 and cladding of each optical fiber 106 is surrounded by a coating 107. The coating 107 may be an acrylate material, for example. In some embodiments, each optical fiber 106 may include an inner first coating having a first diameter (e.g., 100 µm outer diameter) and an outer second coating having a second diameter (250 µm outer diameter). The fiber support features 122 of the fiber tray 120 are dimensioned to accept the coated portion 107 of the optical fibers 106. The core 108 has a central axis 151 as depicted in FIG. 5B. In some embodiments, a front portion of the fiber optic support features 122 may be dimensioned to accept a first coating layer of the coating 107, and a rear portion of the fiber support features 122 may be dimensioned to accept a second coating layer of the coating 107. In other words, a front portion of the fiber support features 122 may be wider than a rear portion in embodiments.

As shown in FIG. 5A, the optical fibers 106 are disposed within the fiber support features 122 such that they extend beyond the second edge 126. Each optical fiber 106 is stripped to expose the core 108 (or cladding), and then cleaved substantially perpendicular to the fiber axis such that each optical fiber 106 extends beyond the second edge 126 of the fiber tray 120 by a length $L_f$. As an example and not a limitation, the optical fibers 106 may be stripped of the coating 107 by a laser stripping process wherein a laser is utilized to remove the coating material. As an example and not a limitation, a laser source may be used to remove the coating 107, such as the laser stripping process offered by OpTek Systems of Abingdon, UK, for example. Other laser stripping methods may also be utilized. Additionally, non-laser stripping methods may be used to strip the coating material, such as chemical, mechanical or hot gas stripping. The stripped optical fiber 106 may be cleaved by laser cleaving or mechanical cleaving, for example. In some embodiments, the optical fibers 106 are not cleaved after being disposed in the fiber tray 120. An exemplary laser cleaving system includes, but is not limited to, laser cleaving systems offered by OpTek Systems of Abingdon, UK.

A stripped portion of a length $L_e$ of each optical fiber 106 is measured from the end of the coating 107 to a fiber end 109. The length $L_f$ after cleaving should be such that the fiber ends 109 of the optical fibers reach the fiber-end datum surface 114, as described in detail below. The length $L_e$ should be equal to or greater than a length of body fiber support features 112 of the body 110 (see FIG. 6A). In embodiments, the optical fibers 106 may be stripped of the coating 107 by a stripping process after being secured to the fiber tray 120 such that multiple optical fibers may be processed in a linear array.

Referring generally to FIGS. 4A-4D, and 5A, the illustrated fiber tray 120 further includes an adhesive well 124 extending a depth $d_w$ into a bulk of the fiber tray 120 from the first surface 121. The adhesive well 124 may be provided to receive an adhesive, such as a curable epoxy, for example, to secure the optical fibers 106 within the fiber support features 122 of the fiber tray 120. Accordingly, the adhesive well 124 is configured as a repository for adhesive. Adhesive applied to the adhesive well 124 may wick along the fiber support features 122 and the coatings 107 of the optical fibers 106. An exemplary UV curing index matched adhesive may include, but is not limited to, Nextgen UV AB14 manufactured by Nextgen Adhesives. Other UV curing index matched adhesives may be used. Although the adhesive well 124 is depicted as being centrally disposed within the first surface 121 of the fiber tray 120, embodiments are not limited thereto. Additionally, the adhesive well 124 may also be configured as more than one well within the first surface 121 of the fiber tray 120 in other embodiments.

The fiber tray 120 may also include adhesive receiving features 127 for securing the fiber tray 120 to the fiber tray recess 118 of the body 110 (FIG. 5A). The adhesive receiving features 127, which in the illustrated embodiment are configured as notches located on the third and fourth edges 123A, 123B of the fiber tray, provide receptacles to receive an adhesive (e.g., a curable index-matching epoxy matching the fiber end 109 to the material of the body 110). In this embodiment, the adhesive receiving features 127 allow for the adhesive to wick under the fiber tray 120 such that the fiber tray 120 may be bonded to a floor 139 of the fiber tray recess 118 of body 110. It should be understood that more than two adhesive receiving features 127 (i.e., additional adhesive receiving features) may be provided, and at locations other than those depicted in the figures are possible. In alternative embodiments, the adhesive receiving features may be configured as through-holes extending from the first surface 121 to the second surface 129 of the fiber tray 120, thereby allowing adhesive to flow between the fiber tray 120 and the fiber tray recess 118 of the body 110. Other embodiments using the concepts disclosed may forgo the use of adhesive receiving features. For instance, adhesive may be disposed between the components or use a mechanical attach between the fiber tray and the body such as a tongue and groove.

Referring to FIG. 4D (as well as to FIGS. 4C and 5B) the fiber optic module may optionally include a tilting feature for angling the fiber tray from the horizontal plane to aid placing the optical fibers in the desired location. For instance, the fiber tray 120 may optionally include one or more tilting protrusions 160 extending from the second surface 129 near the first edge 125 to tilt the fiber tray 120 downward by a tilt angle φ with respect to the second edge 126 and the interface between body fiber support features 112 and fiber-end datum surface 114 of the body 110 when the fiber tray 120 is positioned in the fiber tray recess 118. The title angle φ should be such that the optical fibers 106 extending beyond the second edge 126 of the fiber tray 120 are encouraged to be disposed within the body fiber support features 112 of the body 110, and therefore be pre-aligned with the lenses (described below) of the body 110 prior to active alignment. In other embodiments, no tilting protrusions are provided such that the entire second surface 129 (i.e., bottom surface) of the fiber tray 120 contacts the floor 139 of the fiber tray recess 118 of the body 110. In other embodiments, the tilting feature such as the tilting protrusion(s) may be disposed on the fiber tray recess of the body or both the fiber tray and body; instead of just either the fiber tray or body.

In some embodiments, the fiber tray 120 may also include optional handling features 128 to ease the handling (by human or a machine) of the fiber tray 120, such as when inserting the fiber tray 120 into the fiber tray recess 118 and aligning the fiber ends 109 of the optical fibers into the body fiber support features 112. Further, the fiber tray may have other suitable shapes that are complimentary to the fiber tray recess other than the shapes illustrated.

The fiber tray 120 allows for optical fibers 106 to be grouped together for easy simultaneous processing, which may result in a minimum of fiber to fiber length error (i.e., co-planarity error) which may ensure that each optical fiber 106 is located at the focal point of the respective lens of the body 110.

Body of the Fiber Optic Module

Figure 6A:
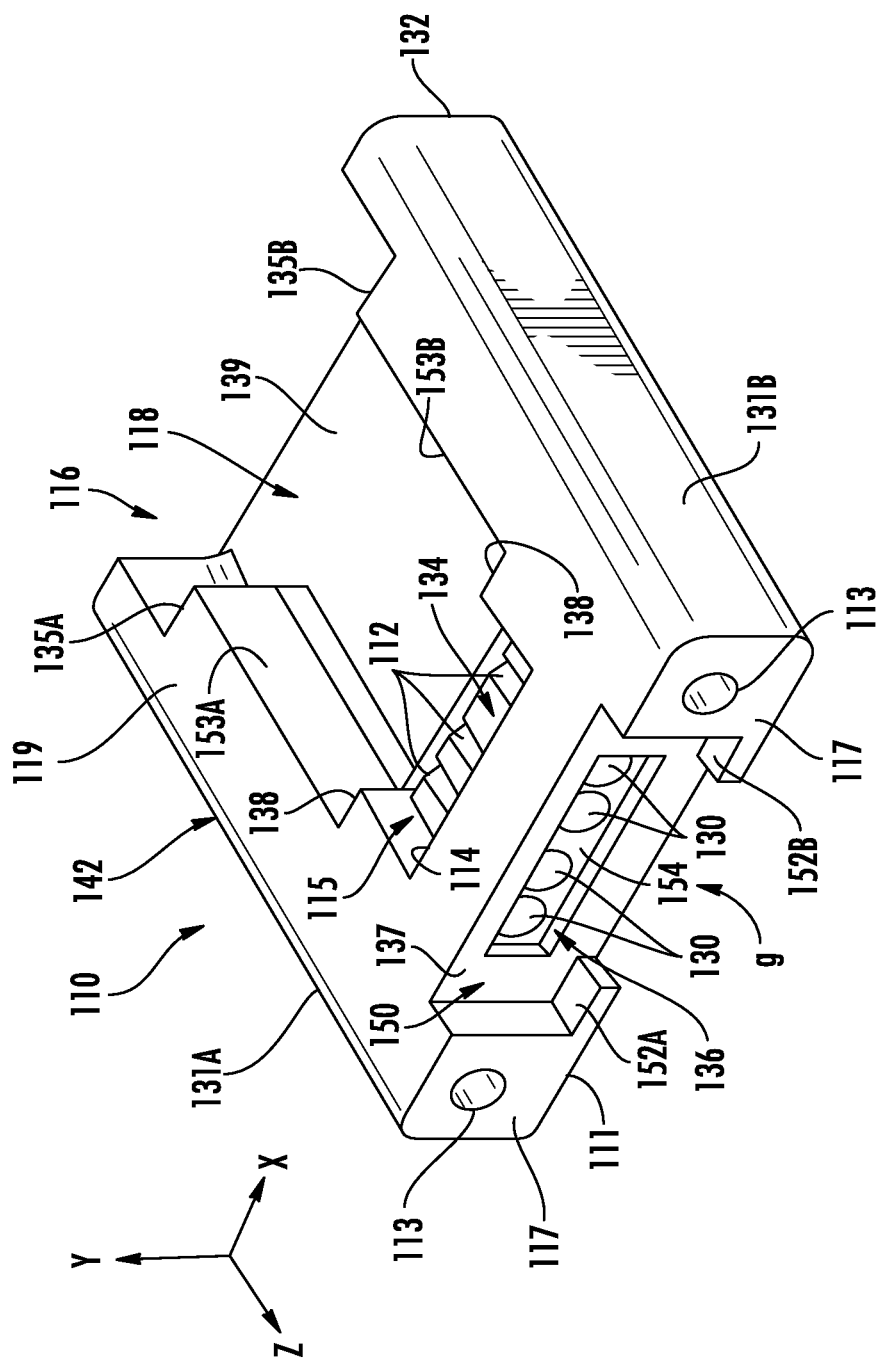
FIG. 6A is a top-down, elevated front view of the body depicted in FIGS. 2A, 2B, 3A, and 3B.
Figure 6B:
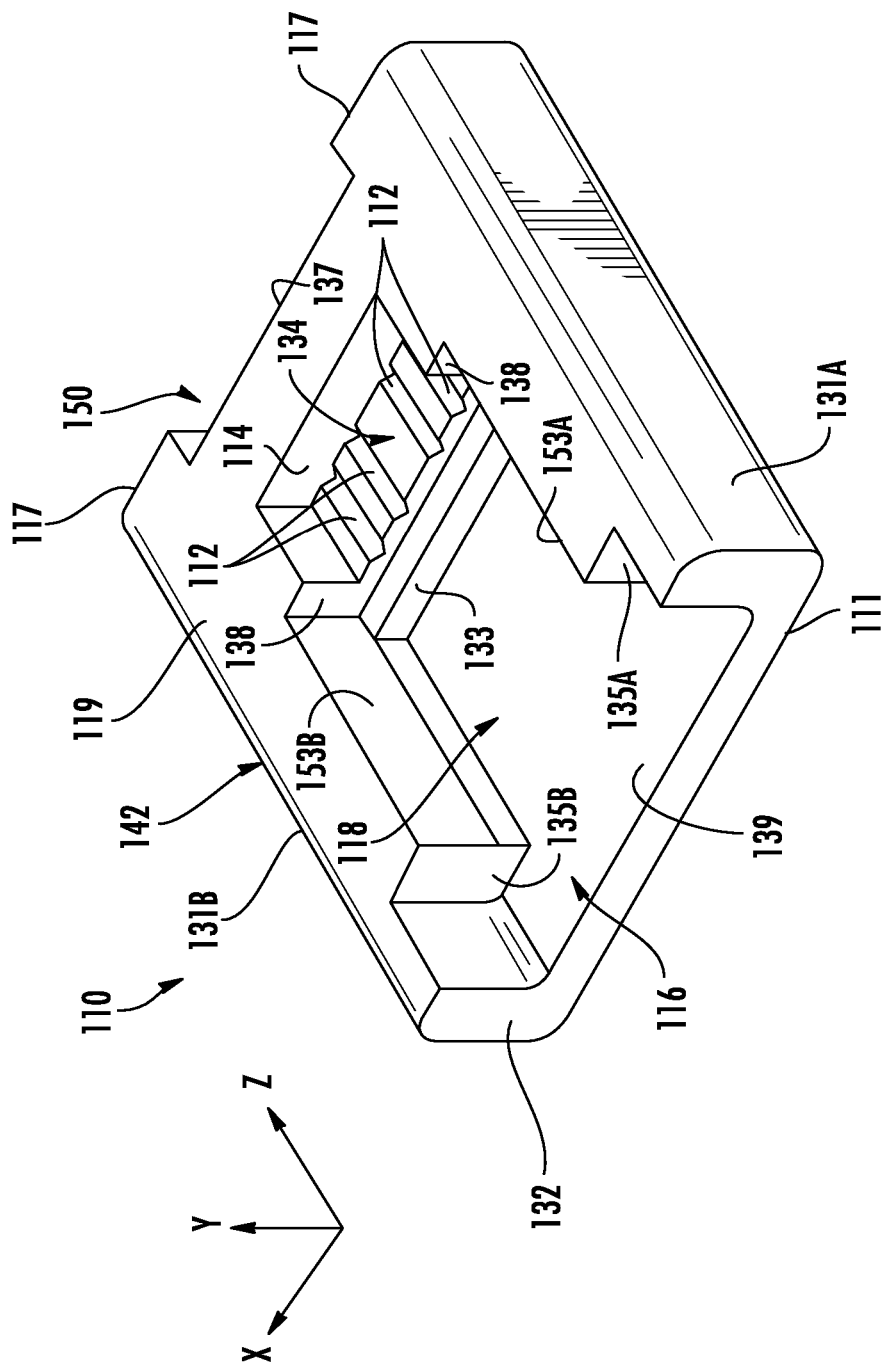
FIG. 6B is a top-down, elevated rear view of the body depicted in FIG. 6A.
Figure 6C:
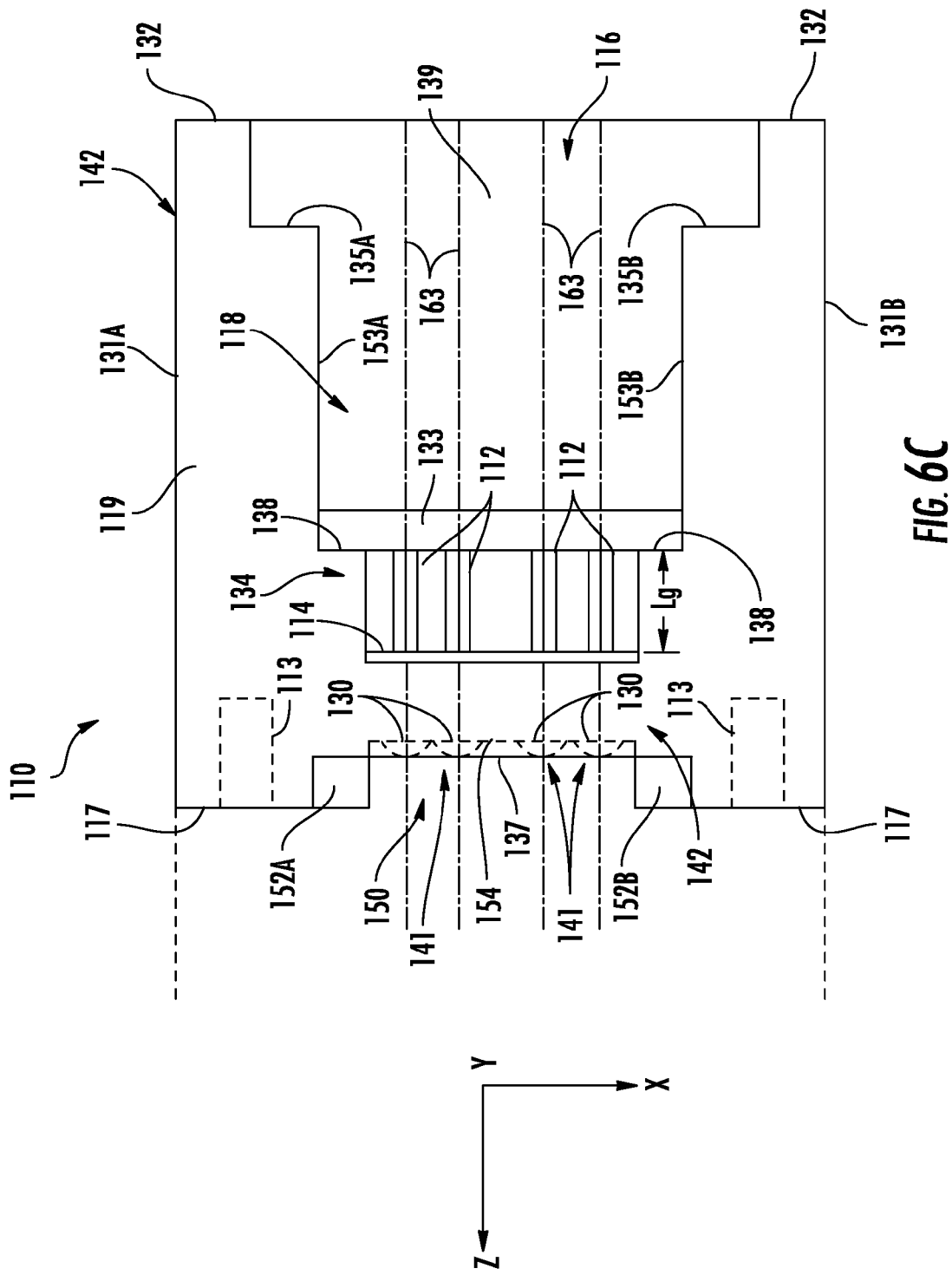
FIG. 6C is a top view of the body depicted in FIG. 6A.
Figure 6D:
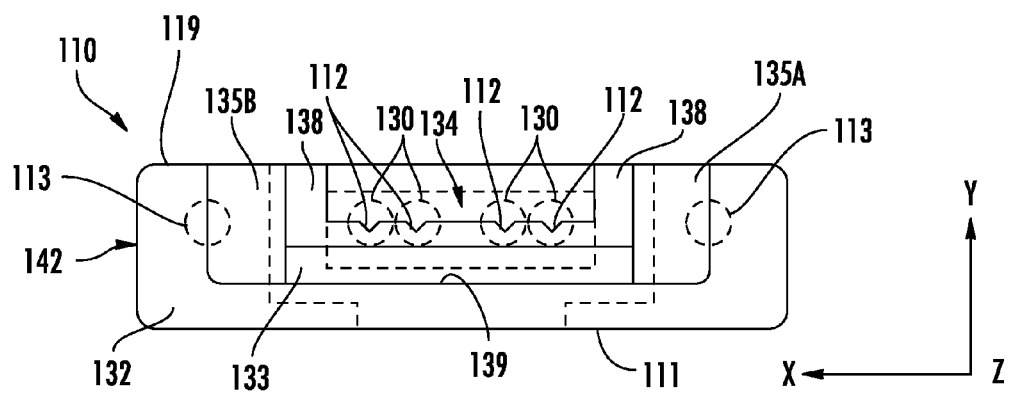
FIG. 6D is a rear view of the body depicted in FIG. 6A.
Figure 6E:
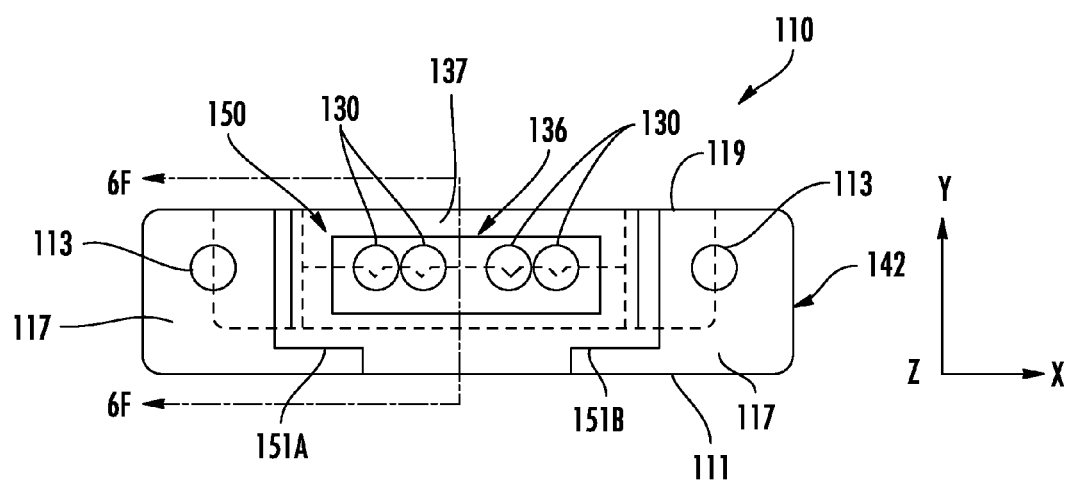
FIG. 6E is a front view of the body depicted in FIG. 6A.
Figure 6F:
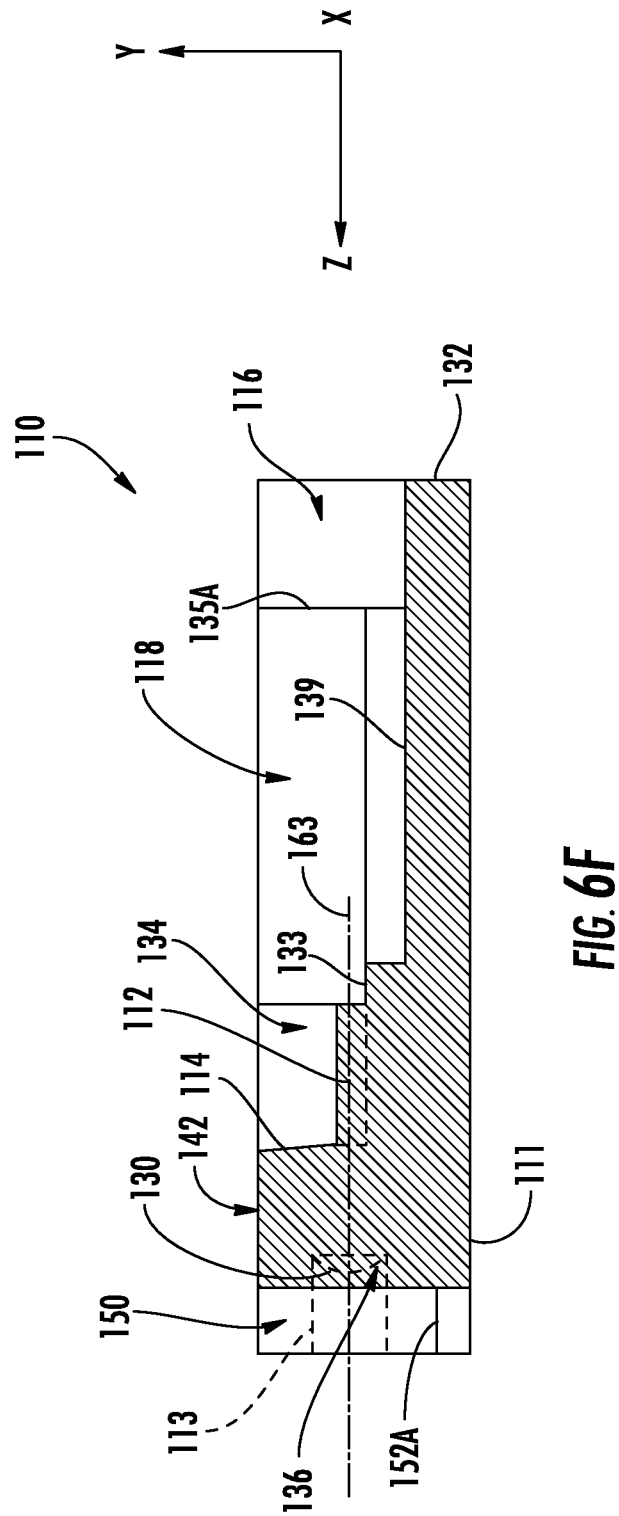
FIG. 6F is a cross-sectional view of the body taken along line 6F-6F of FIG. 6E.

Referring to FIGS. 6A-6F, an exemplary body 110 configured to receive the fiber tray 120 depicted in FIGS. 4A-5B is illustrated. FIG. 6A is a top-down, elevated front view and FIG. 6B is a top-down, elevated rear view of an exemplary body 110. FIG. 6C is a top view of the body 110, FIG. 6D is a rear view of the body 110, and FIG. 6E is a front view of the body 110. FIG. 6F is a cross-sectional view taken along line 6F-6F of FIG. 6E.

Generally, the body 110 is configured to direct optical signals of light emitted from the fiber ends 109 of the optical fibers 106 into lenses of a mated body of a directly coupled, mated fiber optic connector, and direct and focus optical signals received from the directly coupled, mated fiber optic connector into the optical fibers 106. The body 110 is substantially rectangular in shape in the illustrated embodiment. Other configurations are also possible.

The body 110 is made of a material that is transmissive to light having a predetermined wavelength according to the particular optical communication protocol, such as an infrared (IR) wavelength in the range of 800 nm to 1,100 nm, which is the wavelength range of VCSELs used in forming optical data links. As used herein, transmissive means that optical signals are able to pass through the material without significant losses. Other predetermined wavelengths may be used, such as wavelengths in the visible spectrum, for example.

In an example embodiment, the body 110 is formed from a transparent resin such as Polyetherimide (PEI) sold by the General Electric Company under the trademarked name ULTEM® 1010, which has a refractive index of about $n=1.64$ in the aforementioned IR wavelength range. Another exemplary material includes Udel 3700 polysulfone manufactured by Solvay Specialty Polymers. In an example, the body 110 is monolithic and is formed, for example, by molding, by machining or by a combination of both molding and machining. In an example, the mold is made of steel and is precision micro-machined (e.g., by a single-point diamond turning process ("SPDT")) so that the features of body 110, including lens surfaces 130 described below, are formed with high precision to provide fine optical alignment between fiber ends 109 and active optical components.

The body 110 has a front mechanical coupling surface 117 that is configured to contact a mechanical coupling surface of a mated body, a rear end 132 opposite from the mechanical coupling surface 117, a first surface 119, and a second surface 111 opposite from the first surface 119. The example body 110 also includes two sides 153A, 153B and a floor 139 that define the fiber tray recess 118 into which the fiber tray 120 is disposed.

In this embodiment, the fiber tray recess 118 has a wide insertion portion 116 that narrows after two fiber tray stop walls 135A, 135B that may be used as a stop for the handling features 128 of the fiber tray, in some embodiments. The narrow portion of the fiber tray recess 118 is disposed between two parallel sidewalls 153A, 153B such that it has a width to accept the fiber tray 120. The fiber tray recess 118 terminates at a ledge 133 that may be configured to engage the chamfer 162 of the fiber tray 120 when the fiber tray 120 is disposed in the fiber tray recess 118. The ledge 133 transitions into a fiber support ledge 134 having a height that is greater than a height of the ledge 133. The fiber support ledge 134 defines a wall 138. Alternatively, the floor 139 may terminate directly at the fiber support ledge 134 rather than the intermediate ledge 133.

The fiber support ledge 134 includes body fiber support features 112 configured as "V" shaped grooves in the illustrated embodiment. The body fiber support features 112 may also be configured as rectangular grooves, or "U" shaped grooves, for example. Alternatively, the body fiber support features 112 may also be configured as bores dimensioned to receive the stripped portion 108 of the optical fibers 106. The body fiber support features 112 run in the Z direction at a length $L_g$, and may be generally parallel to first and second sides 131A, 131B as desired. In some embodiments, the body fiber support features 112 terminate at a fiber-end datum surface 114 that is substantially orthogonal to the body fiber support features 112 and extends toward the first surface 119, and are open at an opposite end of the fiber support ledge 134. In other embodiments, the fiber-end datum surface 114 is slightly angled (e.g., 5 degrees) with respect to a plane that is orthogonal to the body fiber support features 112 for manufacturing purposes (e.g., to prevent the mold from scuffing the fiber-end datum surface 114 when the mold opens during the fabrication process). The body fiber support features 112 are configured to be aligned with the support features 122 of the fiber tray 120 when the fiber tray 120 is disposed in the fiber tray recess 118. Further, as described in more detail below, each body fiber support feature 112 is aligned with a linear lens axis 163 of each lens to properly locate the fiber axis of the optical fibers 106 with the corresponding lens axis of the lenses. The fiber-end datum surface 114 accordingly acts as a mechanical stop for the fiber ends 109 of the optical fibers 106 that establishes the longitudinal position (i.e., the Z-directional position) of optical fibers 106 supported by the body fiber support features 112.

Referring to FIGS. 6A, 6C, 6E and 6F, the body 110 further includes a cover recess 150 disposed within the mechanical coupling surface 117. The cover recess 150 is centrally positioned along the X-direction and extends from the first surface 119. In the illustrated embodiment, the cover recess 150 does not extend to the second surface 111 but rather terminates at first and second cover support surfaces 152A, 152B that are separated by a gap g. The cover support surfaces 152A, 152B are operable to support a cover 140 disposed within the cover recess 150, as shown in FIGS. 1 and 3A. The gap g and the opening of the cover recess 150 at the first surface allows the edges of the cover 140 to be handled during insertion into the cover recess 150 during the fabrication process. It should be understood that fiber support surfaces may also be provided near the first surface 119 for a symmetrical cover recess, or for no gap to be present between the fiber support features (i.e., a full bottom (and/or top) perimeter wall). In alternative embodiments, no cover 140 or cover recess 150 is provided. In such embodiments, the lens surfaces 130 may be recessed from the mechanical coupling surface 117 and not protected by a cover.

The cover recess 150 is dimensioned to receive the cover 140. The cover recess 150 defines a rear cover wall 137. When inserted into the cover recess 150, a rear surface of the cover 140 contacts the cover wall 137. In some embodiments a front surface of the cover 140 may be slightly offset (e.g., approximately 10 μm) from the mechanical coupling surface 117 in the negative Z-direction to prevent tilt between mated bodies from occurring, as well as to provide some clearance for debris and prevent contact damage to the cover 140.

The cover 140 may be made of any material that is transmissive to wavelengths of the optical signals. As an example and not a limitation, the cover 140 may be made of chemically strengthened aluminoborosilicate glass. In some embodiments, the cover 140 may have an oleophobic, hydrophobic, and/or anti-reflection coating located thereon. As an example, a front surface of the cover 140 may have an oleophobic and/or hydrophobic coating, while a rear surface may have an anti-reflective coating. The cover 140 may have any appropriate dimensions. As an example and not a limitation, the dimensions of the cover 140 are approximately 3.50×1.25×0.40 mm. It should be understood that other dimensions may be utilized depending on the application.

An optical interface recess 136 is disposed within the cover wall 137. The optical interface recess 136 provides an optical interface surface 154 that is offset from the cover wall 137 in the negative Z-direction. A plurality of lens surfaces 130 are provided on the optical interface surface 154. The lens surfaces 130 may be integrally formed with the optical interface surface 154 by precision injection molding, for example. As an example and not a limitation, the lens surface features of the mold that define the lens surfaces 130 may be formed by SPDT. A front surface of the plurality of lens surfaces 130 may be offset from the cover wall 137 such that a rear surface the cover 140 does not contact the plurality of lens surfaces 130.

Referring specifically to FIG. 6C, the plurality of lens surfaces 130, the corresponding portion of the fiber-end datum surface 114, and the corresponding portion of body 110 therebetween define a plurality of refractive lenses 141. Each lens surface 130 can be considered a "front" lens surface and the fiber-end datum surface 114 can be considered a "rear" lens surface. The corresponding portion of the body 110 constitutes the lens body, which is denoted as 142. The axial distance between the front and rear lens surfaces is the lens thickness, i.e., the thickness of the lens body 142. Each lens 141 has a linear optical axis 163 that is aligned with a central axis 151 of a corresponding optical fiber disposed on the fiber tray 120, as described in more detail below with respect to FIGS. 8 and 9. The lens surfaces 130 each have a diameter or clear aperture (CA). In an example, the lens surfaces 130 each have a CA of between 250 μm and 600 μm, and in a more specific example about 500 μm, but other suitable sizes are possible. Each lens 141 is configured to receive a light signal diverging from a fiber-end 109 of an optical fiber 106 and collimate (or otherwise optically condition) it for receipt by a corresponding lens of a mated body, or receive collimated light (or otherwise optically conditioned light) from a mated body and focus it into a corresponding optical fiber 106.

As shown in FIGS. 6C and 6D, the location of the plurality of lens surfaces 130, the fiber-end datum surface 114, and the plurality of body fiber support features 112 are tightly controlled such that the body fiber support features 112 are substantially aligned with the linear axes 163 of the plurality of lenses 141 defined by the plurality of lens surfaces 130 in the X, Y, and Z directions. Accordingly, the body fiber support features 112 are operable to precisely locate the central axis 151 and the fiber-end 109 of the optical fibers 106 disposed therein with respect to the linear optical axis 163 of the lenses (see FIGS. 8 and 9) (e.g., within ±10 μm in the X, Y and Z directions).

Referring generally to FIGS. 6A-6F, in some embodiments the body 110 further includes two alignment bores 113 at the mechanical coupling surface 117. The alignment bores 113 may be operable to receive alignment pins (not shown) of a mated body to align the respective lenses for optical communication. In other embodiments, no alignment bores are provided. Other mechanical alignment features and/or magnetic alignment features may be provided.

Installation of the Fiber Tray and Optical Fibers into the Body

Figure 7:
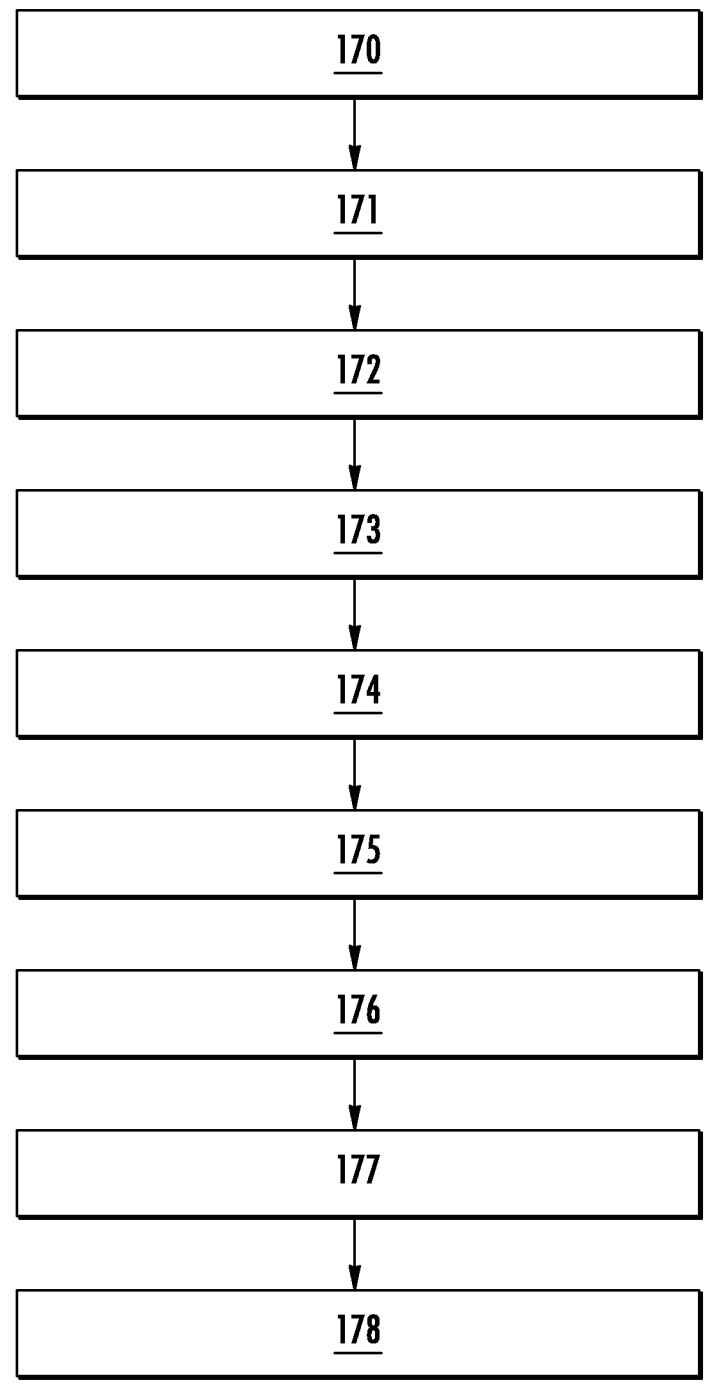
FIG. 7 is a flowchart describing an example optical fiber processing method according to one or more embodiments of the disclosure.

Referring now to FIG. 7, a flowchart of an example method of processing optical fibers 106 is provided. At block 170, a plurality of optical fibers 106 are inserted into the fiber support features 122 within a first surface 121 of the fiber tray 120, as shown in FIGS. 5A and 5B. The fiber ends 109 of the optical fibers extend beyond the second edge 126 by an offset length that is equal to or greater than a length $L_g$ of the body fiber support features 112 on the body 110. As an example and not a limitation, a fixture or automation device may be utilized to accurately position the plurality of optical fibers 106 in the fiber tray 120. At block 171, the length $L_f$ of the portion of the optical fibers 106 that extend beyond the second edge 126 may be verified (e.g., by an appropriate measurement system) in embodiments wherein the optical fibers 106 are not cleaved to the desired length $L_f$.

After the optical fibers 106 are properly positioned within the fiber tray 120, an adhesive, such as a curable epoxy, for example, is applied to the adhesive well 124. The adhesive flows throughout the adhesive well 124 and into the fiber support features 122. Thus, the adhesive secures the optical fibers 106 to the fiber tray 120 (block 172).

Securing the plurality of optical fibers 106 to the fiber tray 120 in such a manner allows for multiple optical fibers 106 to be stripped of their coating layers 107 simultaneously because they are not loose (i.e., they are manageable and maintained in a known, desired arrangement). At block 173, the coating 107 (e.g., an inner coating layer of a first material (e.g., 100 μm outer diameter) and/or an outer coating layer (250 μm outer diameter of a second material) of each optical fiber 106 is removed by a laser stripping process to expose the core 108 (or cladding), thereby forming a stripped portion having a length $L_c$ that is equal to or greater than the length $L_g$ of the body fiber support features 112 on the body 110. Additionally, in some embodiments, the optical fibers 106 are cleaved such that they extend beyond a second edge 126 of the fiber tray 120 by a length $L_f$ (block 174). Any stripping system may be utilized to remove the coating 107 and any other layers of the optical fibers 106 that surround the core 108. Further, any cleaving method may be used to cleave the optical fibers 106 to the proper length. As an example and not a limitation, an exemplary laser stripping process and laser cleaving process includes the optical fiber laser stripping and cleaving systems offered by OpTek Systems of Abingdon, UK. It is noted that stripping processes other than laser stripping processes may be used to remove the coating 107, such as chemical, mechanical or hot gas stripping. Additionally, mechanical cleaving methods may be used to cleave the optical fibers 106 rather than laser cleaving in some embodiments.

At block 175, the fiber tray 120, along with the stripped optical fibers 106, is positioned within the fiber tray recess 118 of the body 110. The fiber tray recess 118 is dimensioned to accommodate the fiber tray 120. In the illustrated embodiment, the fiber tray 120 is inserted into the fiber tray recess 118 in the Z direction. As an example and not a limitation, a vacuum micro-manipulator may be coupled to handling features 128 of the fiber tray 120 to position the fiber tray 120 in the fiber tray recess 118.

At block 176, the stripped portion of exposed core 108 of each optical fiber 106 is positioned in their respective body fiber support feature 112 and contacts (or nearly contacts) the fiber-end datum surface 114 by using an active or passive alignment process. The tolerances of the body 110 are tightly controlled that the interface of the body fiber support features 112 and the fiber-end datum surface 114 provides an accurate location for the fiber end 109 of each optical fiber 106 such that the central axis 151 of each core 108 is substantially aligned with the linear optical axis 163 of the corresponding lens 141 provided by the body 110 (see FIGS. 8 and 9). The active alignment process may utilize a vision system to assist in fully disposing the optical fibers 106 into the respective body fiber support feature 112 such that the optical fibers 106 are substantially orthogonal to, and the fiber ends 109 are positioned at, the fiber-end datum surface 114. The fiber ends 109 may be substantially in contact with the fiber-end datum surface 114. In some embodiments, an X-Y-Z indexing machine (not shown) may be utilized to assist in properly locating the fiber tray 120 in the fiber tray recess 118 such that the fiber ends 109 are in the correct positions. For example, the X-Y-Z indexing machine may allow incremental movements of the fiber tray 120 and/or the body 110 in the X, Y, and Z directions for proper alignment.

In some embodiments, dimensions of the fiber tray recess 118 and the fiber tray 120 may be tightly controlled such that the fiber tray 120 is disposed in the fiber tray recess 118 by a snap fit.

At block 177 the location of the fiber ends 109 of the optical fibers 106 in the body fiber support features 112 is verified. For example, the location of the fiber ends 109 may be verified visually using a microscope or other vision system. Alternatively, the location of the fiber ends 109 may be actively verified by sending and receiving optical signals through the lenses 141 defined by body 110, and confirming receipt of such optical signals.

Figure 8:
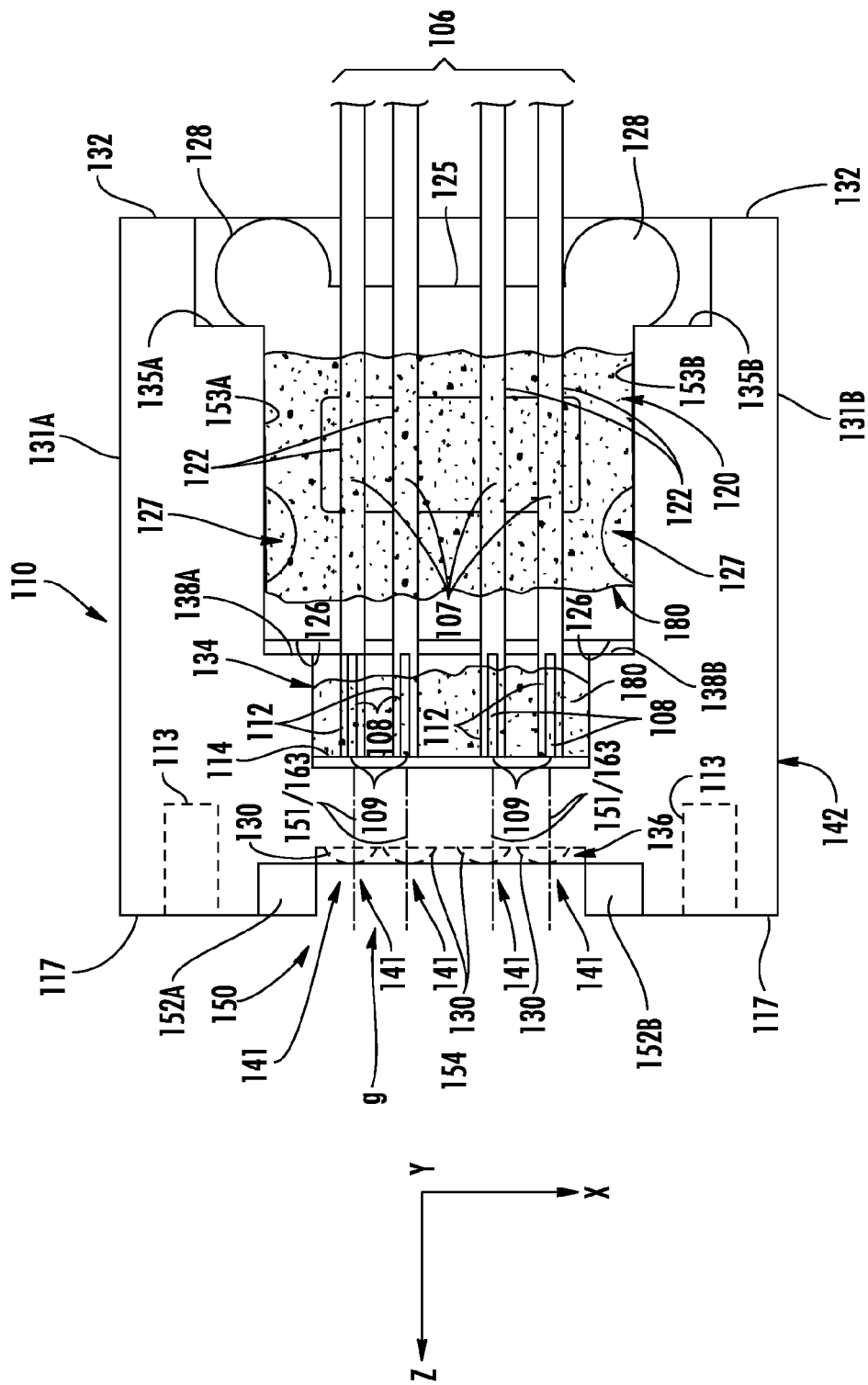
FIG. 8 is a top view of an assembled fiber optic module according to one or more embodiments of the disclosure.

Once the location of the fiber ends 109 is verified, the fiber tray 120 and exposed core 108 of the optical fibers 106 are secured to the body 110 using a suitable material (block 178) as shown in FIG. 8. An example of a suitable material is an index-matching adhesive such as epoxy. The index-matching adhesive substantially matches the index of refraction of the material of the body 110 and the core 108 of the optical fibers 106, and may fill in any gaps that exist between the fiber ends 109 of the optical fibers 106 and the fiber-end datum surface 114. The fiber tray 120 may be secured to the fiber tray recess 118 portion of the body 110 by applying the index-matching adhesive to the adhesive receiving features 127 that define recesses to receive the index-matching adhesive. The adhesive 180 may flow beneath the fiber tray 120 and secure the fiber tray 120 to the floor 139 of the fiber tray recess 118. Similarly, the exposed core 108 of the optical fibers 106 may be secured to the body fiber support features 112 by applying an index-matching adhesive, such as epoxy, to the fiber support ledge 134 and corresponding module fiber support features 112, thereby also index-matching the fiber ends 109 to the fiber-end datum surface 114 for optical coupling.

In some embodiments, the fiber tray 120 may be secured to the body 110 prior to actively positioning the fiber ends 109 in the body fiber support features 112. For example, adhesive 180 may first be applied to the adhesive receiving features 127, followed by active alignment of the fiber ends 109, and then securing the exposed core 108 to the body fiber support features 112 with adhesive.

Figure 9:
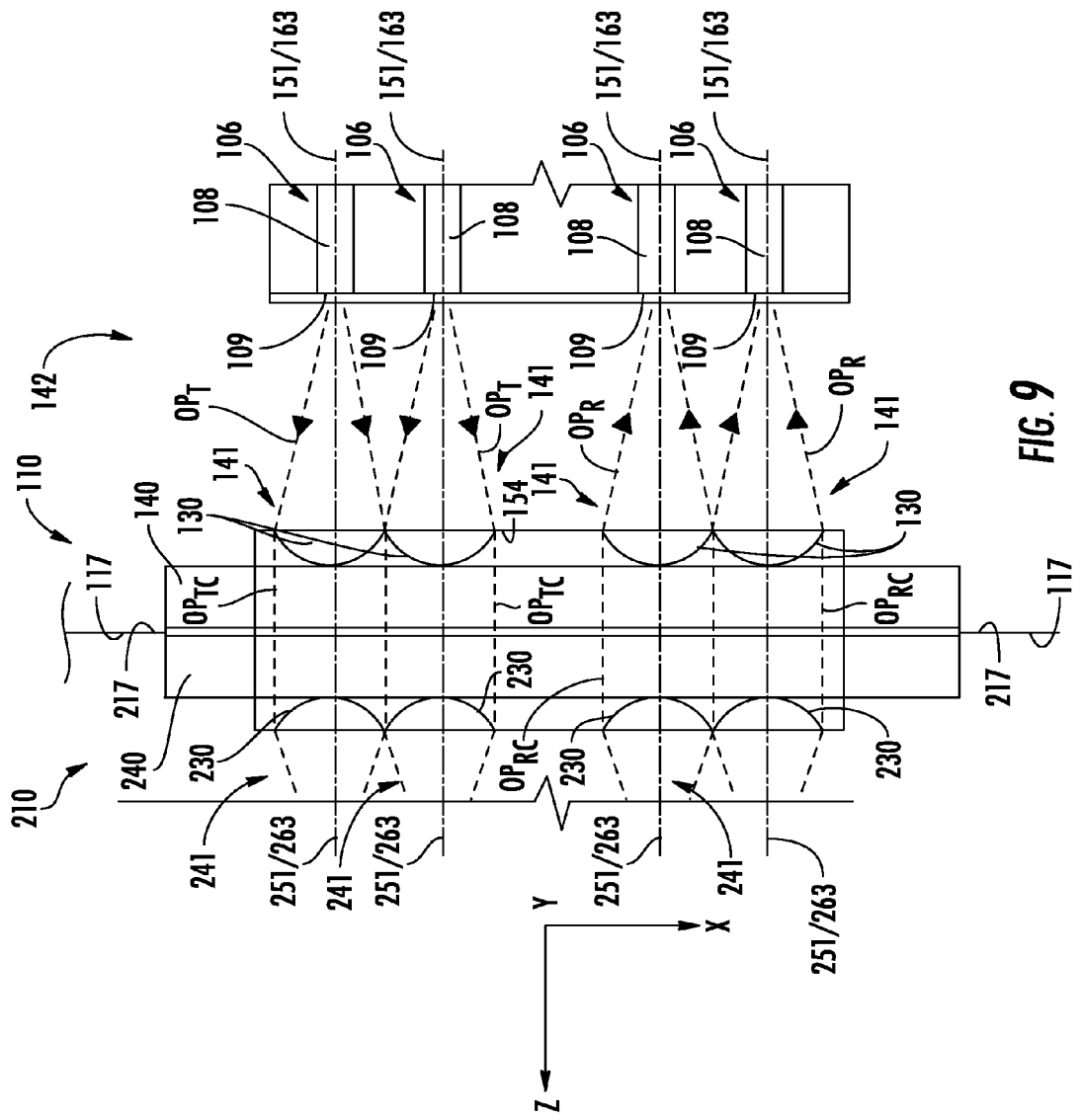
FIG. 9 is a top view of a plurality of lenses of a first fiber optic module optically coupled to a plurality of lenses of a second, mated body according to one or more embodiments of the disclosure.

Referring now to FIG. 9, an exemplary first body 110 coupled to a mated second body 210 and optical signals passing therebetween are illustrated. A mechanical coupling surface 117 of the first body 110 contacts a mechanical coupling surface 217 of the second body 217. A plurality of lens surfaces 130 of the first body 110 is aligned with a plurality of lens surfaces 230 of the second body in the X and Y directions. The central axis 151 of the optical fibers 106 disposed in the body fiber support features 112 is aligned with the linear optical axis 163 of the lenses 141. The central axis 151 of the optical fibers 106 and the linear optical axis of the lenses 141 of the body 110 are aligned with the central axis 251 of optical fibers (not shown) and linear optical axis 263 of the lenses 241 of the mated second body 210. An optical signal in the form of light emitted from the fiber-ends 109 of optical fibers 106 positioned within the body fiber support features 112 diverges within the body 110 in transmission optical path $OP_T$. It is then collimated by the lens 141 at a lens surface 130 and travels through the cover glasses 140, 240 of the first and second bodies 110, 210 as collimated transmission optical path $OP_{TC}$. A corresponding lens surface 230 of the second bodies 210 receives the collimated optical signal and focuses and directs it to a corresponding optical fiber (not shown). Similarly, an optical signal that is collimated by a lens surface 230 of the second body in collimated receiving optical path $OP_{RC}$ is received by a lens surface 130 of the first body 110. The lens 241 defined in part by the lens surface 130 then focuses and directs the received optical signal toward an optical fiber 106 coupled to the body 110 along receiving optical path $OP_R$.

Although the embodiments herein have been described with reference to particular aspects and features, it is to be understood that these embodiments are merely illustrative of desired principles and applications. It is therefore to be understood that numerous modifications may be made to the illustrative embodiments and that other arrangements may be devised without departing from the spirit and scope of the appended claims.

What is claimed is:

1. A fiber optic module comprising:
   a body that is transmissive to light having a predetermined wavelength, the body comprising:
      a fiber tray recess;
      a fiber-end datum surface; and
      a plurality of lens surfaces spaced apart from the fiber-end datum surface, wherein the plurality of lens surfaces, the fiber-end datum surface, and intervening portions of the body define a plurality of lenses each having a linear optical axis; and
   a fiber tray comprising:
      a plurality of fiber support features disposed on a first surface, wherein:
         the plurality of fiber support features is configured to receive a plurality of optical fibers; and
         the fiber tray is disposed within the fiber tray recess and secured to the body such that the plurality of fiber support features is aligned with the linear optical axes of the plurality of lenses.

2. The fiber optic module of claim 1, wherein:
   the fiber tray further comprises:
      a first adhesive receiving feature and a second adhesive receiving feature; and
      an adhesive well extending a depth into the fiber tray across the plurality of fiber support features.

3. The fiber optic module of claim 2, wherein the adhesive well is positioned at the first surface of the fiber tray.

4. The fiber optic module of claim 2, wherein the first adhesive receiving feature and the second adhesive receiving feature are located closer to a second edge than a first edge of the fiber tray.

5. The fiber optic module of claim 2, wherein the fiber tray further comprises a first additional adhesive receiving feature and a second additional adhesive receiving feature.

6. The fiber optic module of claim 1, further including a tilting feature.

7. The fiber optic module of claim 1, wherein:
   the body comprises a fiber support ledge comprising a plurality of body fiber support features having a first end and a second end at the fiber-end datum surface; and the plurality of fiber support features is aligned with the plurality of body fiber support features.

8. The fiber optic module of claim 7, wherein the fiber-end datum surface is angled with respect to a plane that is orthogonal to the fiber support ledge.

9. The fiber optic module of claim 1, wherein:
the body comprises a mechanical coupling surface;
the mechanical coupling surface comprises a cover recess defining a cover wall that is offset from and parallel to the mechanical coupling surface; and
the body comprises a cover disposed in the cover recess such that the cover covers the plurality of lens surfaces.

10. The fiber optic module of claim 9, wherein a front surface of the cover is offset from the mechanical coupling surface.

11. The fiber optic module of claim 9, wherein:
the cover recess extends from the first surface of the body to a first cover support surface and a second cover support surface;
a gap is present between the first cover support surface and the second cover support surface; and
the cover is disposed on the first cover support surface and the second cover support surface within the cover recess.

12. The fiber optic module of claim 1, wherein:
the body comprises a mechanical coupling surface;
the mechanical coupling surface comprises a cover recess defining a cover wall that is offset from and parallel to the mechanical coupling surface;
the cover wall comprises an optical interface recess defining an optical interface surface that is offset from and parallel to the mechanical coupling surface;
the body further comprises a cover disposed in the cover recess; and
the plurality of lens surfaces is located at the optical interface surface and is offset from the cover wall such that the plurality of lens surfaces does not contact the cover.

13. The fiber optic module of claim 12, wherein a front surface of the cover is offset from the mechanical coupling surface.

14. The fiber optic module of claim 13, wherein:
the cover recess extends from the first surface of the body to a first cover support surface and a second cover support surface;
a gap is present between the first cover support surface and the second cover support surface; and
the cover is disposed on the first cover support surface and the second cover support surface within the cover recess.

15. The fiber optic module of claim 1, wherein the body comprises:
a mechanical coupling surface;
a first alignment pin bore extending from the mechanical coupling surface into the body; and
a second alignment pin bore extending from the mechanical coupling surface into the body.

16. A fiber optic connector comprising:
a plurality of optical fibers, each optical fiber having a core surrounded by an outer coating, wherein each optical fiber comprises a stripped region where the core is exposed for a length from a fiber-end;
a body that is transmissive to light having a predetermined wavelength, the body comprising:
a first surface;
a fiber tray recess extending from the first surface;
a fiber-end datum surface;
a fiber support ledge comprising a plurality of body fiber support features having a first end and a second end at the fiber-end datum surface;
a plurality of lens surfaces spaced apart from the fiber-end datum surface, wherein the plurality of lens surfaces, the fiber-end datum surface, and intervening portions of the body define a plurality of lenses each having a linear optical axis; and
a fiber tray comprising a plurality of fiber support features, wherein:
the plurality of optical fibers is disposed within the plurality of fiber support features of the fiber tray such that each individual optical fiber extends beyond the second edge by an offset length $L_f$; and
the fiber tray is disposed within the fiber tray recess and secured to the body by an adhesive such that the stripped region of the plurality of optical fibers are disposed in the plurality of body fiber support features, and fiber-ends of the plurality of optical fibers are positioned at the fiber-end datum surface and are aligned with the linear optical axes of the plurality of lenses; and
a housing surrounding the body and the fiber tray.

17. The fiber optic connector of claim 16, wherein:
the body comprises a mechanical coupling surface;
the mechanical coupling surface comprises a cover recess defining a cover wall that is offset from the mechanical coupling surface; and
the body comprises a cover disposed in the cover recess such that the cover protects the plurality of lens surfaces.

18. A method for making a fiber optic module comprising:
positioning a plurality of optical fibers having a core surrounded by an outer coating in a plurality of fiber support features in a fiber tray such that the plurality of optical fibers extend beyond an insertion edge of the fiber tray by an offset length;
applying an adhesive to a surface of the fiber tray to secure the plurality of optical fibers to the fiber tray;
stripping the outer coating of each optical fiber of the plurality of optical fibers to expose the core, thereby forming a stripped region of each optical fiber;
cleaving each optical fiber to a desired length $L_f$ beyond the insertion edge of the fiber tray;
positioning the fiber tray into a body comprising:
a first surface;
a fiber tray recess extending from the first surface;
a fiber-end datum surface;
a plurality of lens surfaces spaced apart from the fiber-end datum surface, wherein the plurality of lens surfaces, the fiber-end datum surface, and intervening portions of the body define a plurality of lenses each having a linear optical axis;
a plurality of body fiber support features terminating at the fiber-end datum surface, wherein the fiber tray is inserted into the body such that the stripped regions of the plurality of optical fibers are disposed within the plurality of body fiber support features and a fiber-end of each optical fiber is positioned at the fiber-end datum surface; and
applying an adhesive to secure the fiber tray and the plurality of optical fibers to the body.

* * * * *